US010934000B2

(12) United States Patent
Ehlers et al.

(10) Patent No.: US 10,934,000 B2
(45) Date of Patent: Mar. 2, 2021

(54) PASSENGER SEAT ARRANGEMENT, PASSENGER SEAT SYSTEM AND METHOD FOR INSTALLING A PASSENGER SEAT SYSTEM

(71) Applicant: Airbus Operations GmbH, Hamburg (DE)

(72) Inventors: Bernd Ehlers, Hamburg (DE); Stefan Behrens, Achim (DE); Mark Herzog, Hamburg (DE); Alexander Schulz, Hamburg (DE); Max Strieth-Kalthoff, Hamburg (DE); Hans-Gerhard Giesa, Hamburg (DE); Soenke Jacobsen, Hamburg (DE); Joerg Weifenbach, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 270 days.

(21) Appl. No.: 16/140,919

(22) Filed: Sep. 25, 2018

(65) Prior Publication Data

US 2019/0092477 A1 Mar. 28, 2019

(30) Foreign Application Priority Data

Sep. 26, 2017 (DE) ...................... 10 2017 122 252.9

(51) Int. Cl.
*B64D 11/06* (2006.01)
*B60N 2/02* (2006.01)
(Continued)

(52) U.S. Cl.
CPC .......... *B64D 11/064* (2014.12); *B60N 2/0292* (2013.01); *B60N 2/682* (2013.01);
(Continued)

(58) Field of Classification Search
CPC .............. B64D 11/064; B64D 11/0601; B64D 11/0602; B64D 11/0639; B60N 2/77; B60N 2/0292; B60N 2/682
See application file for complete search history.

(56) References Cited

U.S. PATENT DOCUMENTS

| 357,623 A | 2/1887 | Pease |
|---|---|---|
| 592,247 A | 10/1897 | Gilfillan |

(Continued)

FOREIGN PATENT DOCUMENTS

| DE | 838616 B | 6/1952 |
|---|---|---|
| DE | 866502 C | 2/1953 |

(Continued)

OTHER PUBLICATIONS

European Search Report for corresponding European Patent Application No. 18196423.
German Search Report; priority document.

*Primary Examiner* — Anthony D Barfield
(74) *Attorney, Agent, or Firm* — Greer, Burns & Crain, Ltd.

(57) ABSTRACT

A passenger seat arrangement for installation in an aircraft comprises a seat unit with a backrest element and a seat element. The seat arrangement also comprises a supporting frame carrying the seat unit and comprising at least one seat mounting, which has a first backrest holder, to which the backrest element can be releasably fixed in a load-transferring manner in a first position on the seat mounting, and a second backrest holder, to which the backrest element can be releasably fixed in a load-transferring manner in a second position on the seat mounting. When the passenger seat arrangement is installed in the aircraft, the backrest element is pivoted in relation to a longitudinal axis of the aircraft in
(Continued)

a state in which it is fixed to the first backrest holder relative to a state in which it is fixed to the second backrest holder.

15 Claims, 29 Drawing Sheets

(51) Int. Cl.
  *B60N 2/75* (2018.01)
  *B61D 33/00* (2006.01)
  *B60N 2/68* (2006.01)

(52) U.S. Cl.
  CPC ........... *B60N 2/77* (2018.02); *B61D 33/0078* (2013.01); *B61D 33/0085* (2013.01); *B64D 11/0601* (2014.12); *B64D 11/0602* (2014.12); *B64D 11/0639* (2014.12); *B60N 2002/684* (2013.01); *B64D 11/0605* (2014.12); *B64D 11/0648* (2014.12)

(56) References Cited

U.S. PATENT DOCUMENTS

| | | |
|---|---|---|
| 4,718,720 A | 1/1988 | Braun et al. |
| 6,991,285 B1 | 1/2006 | Hemenway |
| 2005/0253433 A1 | 11/2005 | Brown et al. |
| 2007/0126270 A1 | 6/2007 | Saint-Jalmes et al. |
| 2014/0138991 A1 | 5/2014 | Deimen et al. |
| 2016/0272323 A1* | 9/2016 | Carlioz ............ B64D 11/0602 |

FOREIGN PATENT DOCUMENTS

| | | | |
|---|---|---|---|
| DE | 962807 B | 4/1957 | |
| DE | 3342881 A1 | 6/1985 | |
| DE | 87044 A | 7/1985 | |
| DE | 19848932 A1 | 4/2000 | |
| FR | 2491312 A1 * | 4/1982 | ............ A47C 7/546 |
| WO | 2010131014 A1 | 11/2010 | |
| WO | 2011077363 A2 | 6/2011 | |

* cited by examiner

PASSENGER SEAT ARRANGEMENT, PASSENGER SEAT SYSTEM AND METHOD FOR INSTALLING A PASSENGER SEAT SYSTEM

CROSS-REFERENCES TO RELATED APPLICATIONS

This application claims the benefit of the German patent application No. 10 2017 122 252.9 filed on Sep. 26, 2017, the entire disclosures of which are incorporated herein by way of reference.

BACKGROUND OF THE INVENTION

The present invention relates to a passenger seat arrangement for installation in an aircraft, to a passenger seat system comprising the passenger seat arrangement and to a method for installing such a passenger seat system.

The configurability of passenger cabins is a requirement for passenger aircraft that is becoming increasingly important. Its purpose is to allow passenger cabins to be customized and adapted to the respective type of use of the aircraft, for example as a short-haul, medium-haul or long-haul aircraft, and to the passengers to be transported. Depending on the type of use of the passenger aircraft and the persons to be transported, an arrangement of passenger seats within the passenger cabin intended for the respective uses can vary.

Passenger aircraft in use at present comprise multiple rows of seats, which are formed by banks of seats comprising one to three seats. Such banks of seats are connected in a load-transferring manner to a floor of the passenger cabin by way of a supporting frame carrying the seats. The seats usually have a seat area and a backrest that is pivotable in relation to the latter, which are firmly connected to the supporting frame. Furthermore, the seats are usually oriented in the longitudinal direction of the aircraft and comprise a folding table, which is arranged either on a backrest of a neighboring bank of seats or in an armrest.

In order to change or adapt the arrangement and orientation of seats provided in this way within the aircraft cabin, it is usually necessary to detach and re-fix the complete bank of seats carrying the seats.

SUMMARY OF THE INVENTION

The invention is based on an object of providing a flexible passenger seat arrangement for installation in an aircraft with which an arrangement of seats within the aircraft can be configured easily and with reduced effort, even while the aircraft is in flight operation. Furthermore, a passenger seat system comprising the passenger seat arrangement and a method for installing such a passenger seat system are to be provided.

A passenger seat arrangement according to the invention is intended for installation in an aircraft, in particular in a passenger cabin of the aircraft. Passenger cabins are usually fitted out with multiple rows of seats arranged one behind the other and alongside one another in a longitudinal direction of the aircraft and respectively provide multiple seats, for example one to four seats, for passengers on the aircraft. The passenger seat arrangement proposed here comprises at least one seat unit, on which a passenger can sit down during the operation of the aircraft. Preferably, the passenger seat arrangement comprises multiple seat units, for example three seat units, and forms a row of seats of the passenger cabin. In a state in which it is installed in the aircraft, the passenger seat arrangement is preferably installed behind or between rows of seats in a passenger cabin in a longitudinal direction of the aircraft.

The at least one seat unit comprises a backrest element and a seat element. To be more precise, the backrest element preferably comprises a headrest and a backrest area and is pivotable in relation to the seat element between an upright position and a reclined position. The seat element preferably comprises a seat area for receiving a passenger. Furthermore, the passenger seat arrangement may have armrest elements, each seat unit preferably being assigned two armrest elements.

The passenger seat arrangement also comprises a supporting frame, which carries the at least one seat unit and is preferably connectable by way of multiple supporting feet in a load-transferring manner to an aircraft cabin floor, in particular, a seat rail of the aircraft for anchoring passenger seats in the passenger cabin. The supporting frame comprises at least one seat mounting, which is preferably respectively assigned to a seat unit and fixes the latter to the supporting frame. In other words, each of the at least one seat units is preferably fixed, in each case, to one of the at least one seat mountings.

The at least one seat mounting comprises a first backrest holder, to which the backrest element of the seat unit can be fixed in a releasable and load-transferring manner in a first position on the seat mounting, and a second backrest holder, to which the backrest element can be fixed in a releasable and load-transferring manner in a second position on the seat mounting. In a state of the passenger seat arrangement in which it is installed in the aircraft, the backrest element is pivoted in relation to a longitudinal axis of the aircraft in a state in which it is fixed to the first backrest holder relative to a state in which it is fixed to the second backrest holder. In other words, a shifting and turning of the backrest element is caused by the backrest element being moved from the first position into the second position by being released from the first backrest holder and fixed to the second backrest holder. Correspondingly, in the state in which it is installed on the first backrest holder, the backrest element is offset and turned in relation to the longitudinal axis of the aircraft relative to the state in which it is fixed to the second backrest holder. Preferably, in the installed state of the passenger seat arrangement, the backrest element is arranged pivoted about an axis parallel to a vertical axis of the aircraft in the state in which it is fixed to the first backrest holder relative to the state in which it is fixed to the second backrest holder.

In this way, an alignment of the seat unit can be changed. An alignment or orientation of the seat unit is understood in the present case as meaning a direction in which a passenger sitting on the seat unit in an upright position is looking. For example, the backrest area of the backrest element may be arranged oppositely in the state in which it is fixed to the first backrest holder relative to the state in which is fixed to the second backrest holder.

To be more precise, in the state of the passenger seat arrangement in which is installed in the aircraft, the backrest element may be pivoted by substantially 90° or 180° in relation to the longitudinal axis of the aircraft in the state in which it is fixed to the first backrest holder relative to the state in which it is fixed to the second backrest holder. In particular, in the state of the passenger seat arrangement in which it is installed in the aircraft, the backrest element may be arranged pivoted by substantially 90° or 180° about the axis parallel to the vertical axis of the aircraft in the state in which it is fixed to the first backrest holder relative to the state in which it is fixed to the second backrest holder.

Providing a passenger seat arrangement in which a backrest element can optionally be fixed to the seat mounting in the first or second position allows an alignment of the respective seat units to be configured easily and with reduced effort. In this way, the passenger seat arrangement can be reconfigured even during flight operation of the aircraft by flight personnel. It does not necessitate the removal and re-installation of complete banks of seats.

For example, the passenger seat arrangement may be intended for having its at least one seat unit oriented in the longitudinal direction of the aircraft during landing or takeoff of the aircraft. When the aircraft then changes to flight operation, the present invention allows the passenger seat arrangement to be reconfigured during flight operation by the flight personnel. For example, the at least one seat unit can thus be aligned during flight operation in a direction counter to the longitudinal direction of the aircraft. In this way, an aircraft cabin area can be changed over from a normal seating area during landing or takeoff, in which seat units of banks of seats arranged one behind the other are aligned in the longitudinal direction of the aircraft, to an alternatively used seating area, in which seat units of banks of seats arranged one behind the other are arranged oppositely. The changeover to the alternatively used seating area allows, for example, a number of passengers sitting opposite one another to eat together or talk to one another.

In a further development, the backrest element may comprise at least one first engaging element, which is designed to engage releasably with at least one complementary second engaging element respectively formed in the first and the second backrest holder, in order to fix the backrest element in a load-transferring manner in the first or second position on the seat mounting. In particular, the at least one first engaging element may be formed on at least one connecting strut of the backrest element. Furthermore, the first and the second backrest holder may be respectively provided with at least one receiving opening having the second engaging element. The receiving openings are preferably provided in such a way that the connecting strut of the backrest element formed with the first engaging element can be pushed into it, in order to engage the first engaging element with one of the second engaging elements, i.e., with the second engaging element of the first backrest holder and/or with the second engaging element of the second backrest holder.

In order to allow easy reconfiguring of the passenger seat arrangement, it comprises a locking mechanism locking the backrest element to the first and/or the second backrest holder. The locking mechanism preferably has the effect that a load-transferring connection between the backrest element and the seat mounting is either maintained or released. Correspondingly, the locking mechanism may be designed to move the first engaging element and/or the second engaging element of the first and/or the second backrest holder between a locking position, in which the first engaging element is engaged with the second engaging element of the first or the second backrest holder, and a release position, in which a movement of the first engaging element in relation to the second engaging element of the first and/or the second backrest holder is released.

Use of the locking mechanism means that no tool is required for fixing and releasing the backrest element. It can in this way be ensured that the passenger seat arrangement is reconfigured with particularly reduced effort and particularly quickly.

In a further development, the locking mechanism may comprise at least one spring unit, which loads the first engaging element and/or the second engaging element of the first and/or the second backrest holder in the direction of its/their locking position or release position. Loading the first or second engaging element in the direction of its locking position allows an undesired release of the load-transferring connection between the backrest element and the seat mounting to be prevented, and as a result the operational reliability of the passenger seat arrangement to be increased.

The locking mechanism may comprise a blocking mechanism, blocking the first engaging element and/or the second engaging element of the first and/or the second backrest holder in its/their locking position and/or blocking position. The blocking mechanism may be movable between a blocking position, in which a movement of the first engaging element and/or the second engaging element of the first and/or the second backrest holder between its/their locking position and its release position is blocked, and a release position, in which a movement of the first engaging element and/or the second engaging element of the first and/or the second backrest holder between its/their locking position and release position is released. Furthermore, the blocking mechanism may comprise a first spring, loading the blocking mechanism in the direction of its blocking position.

In a further development, the first backrest holder may comprise a first locking bolt, which at least partially forms the locking mechanism, it being possible for the at least one second engaging element of the first backrest holder to be arranged on a circumference of the first locking bolt. The first locking bolt may be movable in a direction along its longitudinal direction, in order to move the second engaging element of the first backrest holder between its locking position and its release position. In particular, the first locking bolt may have at least one locking element, preferably in the form of at least one clearance provided on the first locking bolt. The at least one locking element is preferably designed to interact with a first blocking element of the blocking mechanism, in order to block a movement of the first locking bolt along its longitudinal axis.

Alternatively or additionally, the second backrest holder may comprise a second locking bolt, which at least partially forms the locking mechanism, it being possible for the at least one second engaging element of the second backrest holder to be arranged on a circumference of the second locking bolt. The second locking bolt may be movable in a direction along its longitudinal direction, in order to move the second engaging element of the second backrest holder between its locking position and its release position. In particular, the second locking bolt may have at least one locking element, preferably in the form of at least one clearance provided on the second locking bolt. The at least one locking element of the second locking bolt is preferably designed to interact with a second blocking element of the blocking mechanism, in order to block a movement of the second locking bolt along its longitudinal axis.

In a further development, the seat element may be able to be fixed in a releasable and load-transferring manner to the first backrest holder in a first position or to the second backrest holder in a second position. In this case, in the state of the passenger seat arrangement in which it is installed in the aircraft, the seat element may be pivoted about the axis parallel to the vertical axis of the aircraft in a state in which it is fixed to the first backrest holder relative to a state in which it is fixed to the second backrest holder. In particular, in the state of the passenger seat arrangement in which it is installed in the aircraft, the seat element may be pivoted by substantially 90° or 180° about the axis parallel to the vertical axis of the aircraft in the state in which it is installed on the first backrest holder relative to the state in which it is installed on the second backrest holder. The passenger seat arrangement is preferably designed in such a way that the backrest element can be fixed to the first backrest holder in a state in which the seat element is fixed to the second backrest holder, or the backrest element can be fixed to the second backrest holder in a state in which the seat element is fixed to the first backrest holder.

This configuration allows that the seat element can be fixed to the seat mounting in dependence on the position of the backrest element. In other words, the alignment of the seat element can be adapted in a way corresponding to the alignment of the backrest element, which increases comfort for passengers. Providing and designing the first and second backrest holders for fixing the seat element to the seat mounting allows the number of fixing means provided in the passenger seat arrangement to be reduced, and thus a space-saving and weight-optimized design of the passenger seat arrangement to be ensured.

Specifically, the seat element may have at least one third engaging element, which complements the second engaging element and is designed to engage releasably with at least one of the second engaging elements formed in the first and the second backrest holder, in order to fix the seat element in a load-transferring manner in its first or second position on the seat mounting. The at least one third engaging element may be formed on at least one connecting strut of the seat element, which can be pushed into the at least one receiving opening of the first or the second backrest holder, in order to engage the third engaging element with one of the second engaging elements.

Furthermore, the seat element may have at least one clearance, in particular in the form of a through-opening, in which, in an installed state of the backrest element and the seat element on the seat mounting, the first or second backrest holder and/or the backrest element, in particular the at least one connecting strut of the backrest element, is/are partly accommodated.

Alternatively, the seat element may be firmly fixed to the seat mounting. In other words, the passenger seat arrangement may be designed in such a way that moving of the backrest element from the first position into the second position and vice versa does not require any conversion of the seat element. Here, the seat element may be provided in the region of the first backrest holder with at least one first clearance, in which, in an installed state of the backrest element on the first backrest holder, the first backrest holder and/or the backrest element, in particular the at least one connecting strut of the backrest element, is/are partly accommodated. Furthermore, the seat element may be provided in the region of the second backrest holder with at least one second clearance, in which, in an installed state of the backrest element on the second backrest holder, the second backrest holder and/or the backrest element, in particular the at least one connecting strut of the backrest element, is/are partly accommodated.

In a further development, the passenger seat arrangement may comprise at least one armrest element, which can be fixed in a releasable and load-transferring manner to the backrest element and the seat mounting. This configuration allows that some of the forces acting on the backrest element during operation can be transferred by way of the armrest element to the seat mounting. Thus, in particular a torque acting on a connecting point between the seat mounting and the backrest element can be reduced and a design appropriate for the loading can be achieved.

To be more precise, the armrest element may comprise a first connecting element, which is configured and designed to engage releasably with a complementary second connecting element attached to the backrest element, in order to fix the armrest element to the backrest element in a load-transferring manner. In particular, the first and the second connecting element may interact and be formed in such a way that, in a state in which they are engaged on one another, a rotational movement of the armrest element in relation to the backrest element is blocked and a translational movement of the armrest element in relation to the backrest element in the direction of a release position of the armrest element is released, in order to release the first connecting element from the second connecting element. In other words, a release position of the armrest element is understood in the present case as meaning a position in which the armrest element is released from the backrest element and the seat mounting. The first and the second connecting element are preferably provided in such a way that, in a state in which they are engaged on one another, the armrest element is movable in a direction away from the seat mounting in a state in which it is mounted on the seat mounting, in order to assume its release position.

Alternatively or additionally, the armrest element may comprise a third connecting element, which is designed to engage releasably with a fourth connecting element attached to the seat mounting, in order to fix the armrest element on the seat mounting in a load-transferring manner. In particular, the third connecting element and the fourth connecting element may, in a state in which they are engaged on one another, interact and be formed in such a way that a rotational movement of the armrest element in relation to the seat mounting is blocked and a translational movement of the armrest element in relation to the seat mounting in the direction of the release position of the armrest element is released, in order to release the third connecting element from the fourth connecting element.

Furthermore, the armrest element may comprise a further blocking mechanism, which may be designed to block a movement of the armrest element in the direction of its release position, in which the first connecting element is released from the second connecting element and the third connecting element is released from the fourth connecting element, in a state of the armrest element in which it is fixed to the backrest element and the seat mounting. In other words, the further blocking mechanism locks the armrest element in the position in which it is fixed to the backrest element and the seat mounting. In this way, an undesired release of the armrest element from the backrest element and the seat mounting can be prevented.

Alternatively or additionally, the armrest element may comprise a further spring unit, which, in a state in which it is installed on the backrest element and/or the seat mounting, loads the armrest element in the direction of its release position. In this way, the handling of the armrest element can be made easier for a user when reconfiguring the passenger seat arrangement.

A passenger seat system comprises at least one passenger seat arrangement with the aforementioned features. The passenger seat arrangement can be connected in a load-transferring manner by way of the supporting frame to a structure of the aircraft, in particular a seat rail of the aircraft for anchoring passenger seats in a passenger cabin. In a further development, the passenger seat arrangement may be connectable to the structure of the aircraft in front of or behind, in a longitudinal direction of the aircraft, a further passenger seat arrangement installed in the aircraft. In particular, the passenger seat arrangement may be connectable to the structure of the aircraft in a first position and in a second position in the longitudinal direction of the aircraft, it being possible for a distance between the passenger seat arrangement and the further passenger seat arrangement to be greater in the second position than in the first position of the passenger seat arrangement. In this way, a distance between the passenger seat arrangement and a further passenger seat arrangement can be set according to the configuration, and as a result the comfort for passengers can be increased.

The passenger seat system also comprises a table arrangement, which, in a state of the passenger seat arrangement in which it is installed in the aircraft, can be connected in a load-transferring manner to the structure of the aircraft, in particular the seat rail, in front of or behind the passenger seat arrangement in the longitudinal direction of the aircraft. To be more precise, the table arrangement may be designed to be connectable in a load-transferring manner to the structure of the aircraft between the passenger seat arrangement and the further passenger seat arrangement.

A method for installing a passenger seat system in an aircraft comprises a step of installing a passenger seat arrangement with the aforementioned features in the aircraft by connecting the supporting frame of the passenger seat arrangement to a structure of the aircraft in a load-transferring manner. The installation may be performed in such a way that the passenger seat arrangement is arranged behind a further passenger seat arrangement in a longitudinal direction of the aircraft. Furthermore, the backrest element is released from the first backrest holder of the seat mounting and the backrest element is fixed to the second backrest holder of the seat mounting. Furthermore, the method comprises a step of installing in the aircraft a table arrangement in front of or behind the passenger seat arrangement in the longitudinal direction of the aircraft, in particular, between the passenger seat arrangement and the further passenger seat arrangement, by connecting the table arrangement to the structure of the aircraft in a load-transferring manner.

BRIEF DESCRIPTION OF THE DRAWINGS

Preferred exemplary embodiments of the invention are explained in more detail below on the basis of the appended schematic drawings, in which.

DETAILED DESCRIPTION OF THE PREFERRED EMBODIMENTS

Figure 1:
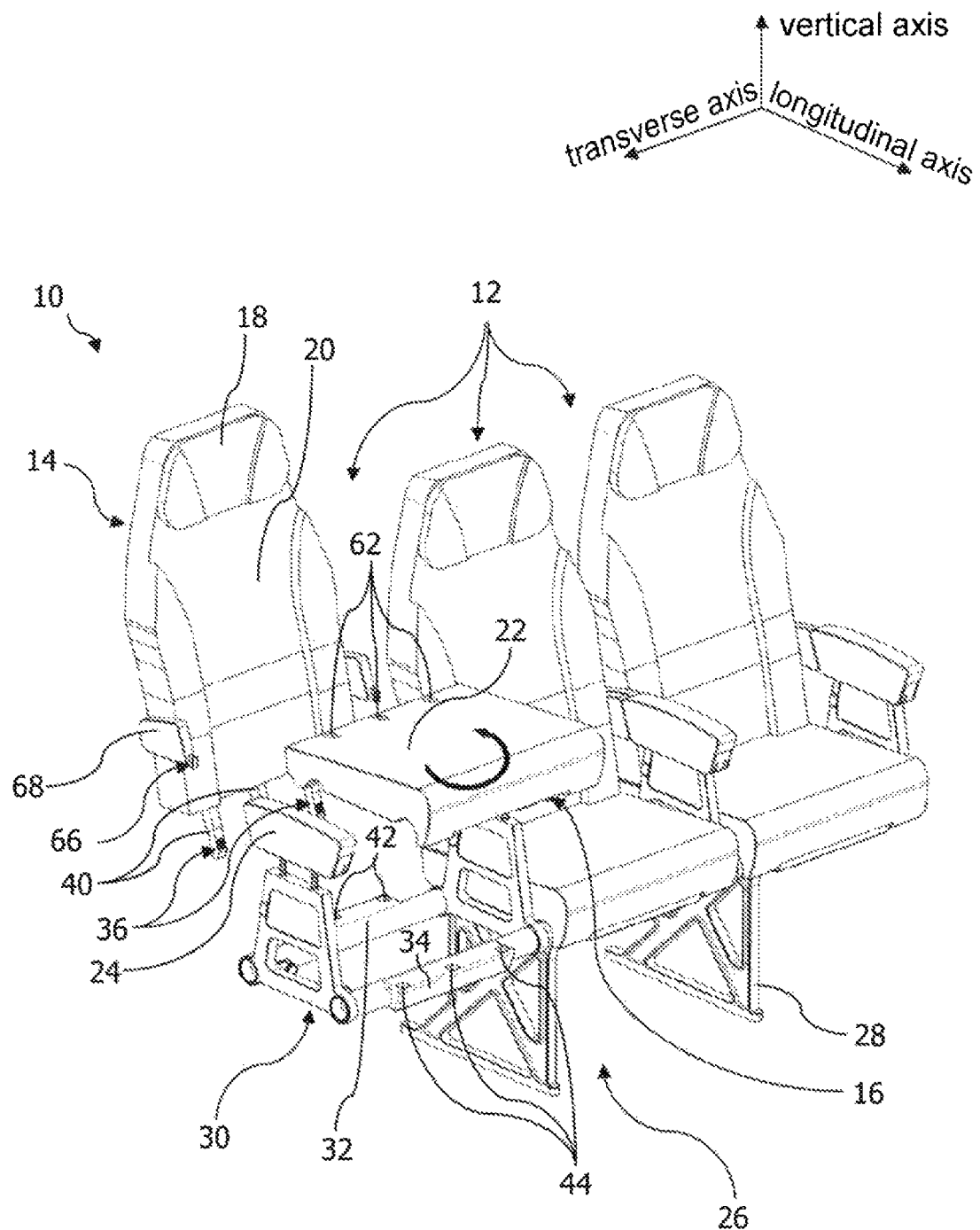
FIG. 1 shows a perspective view of a passenger seat arrangement in a first state.
Figure 2:
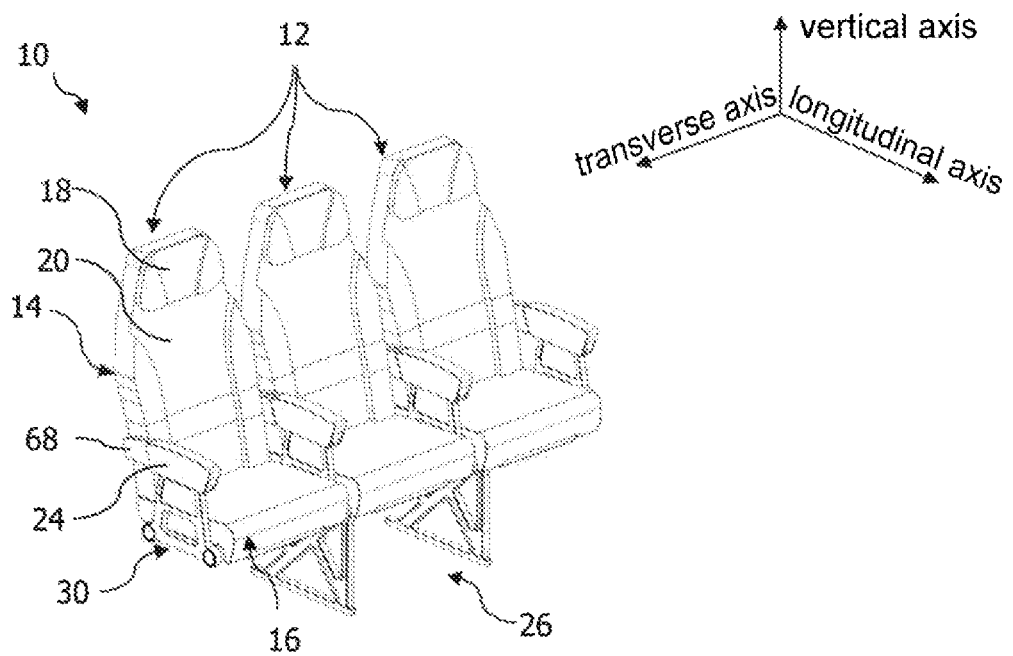
FIG. 2 shows the passenger seat arrangement shown in FIG. 1 in a second state.
Figure 3:
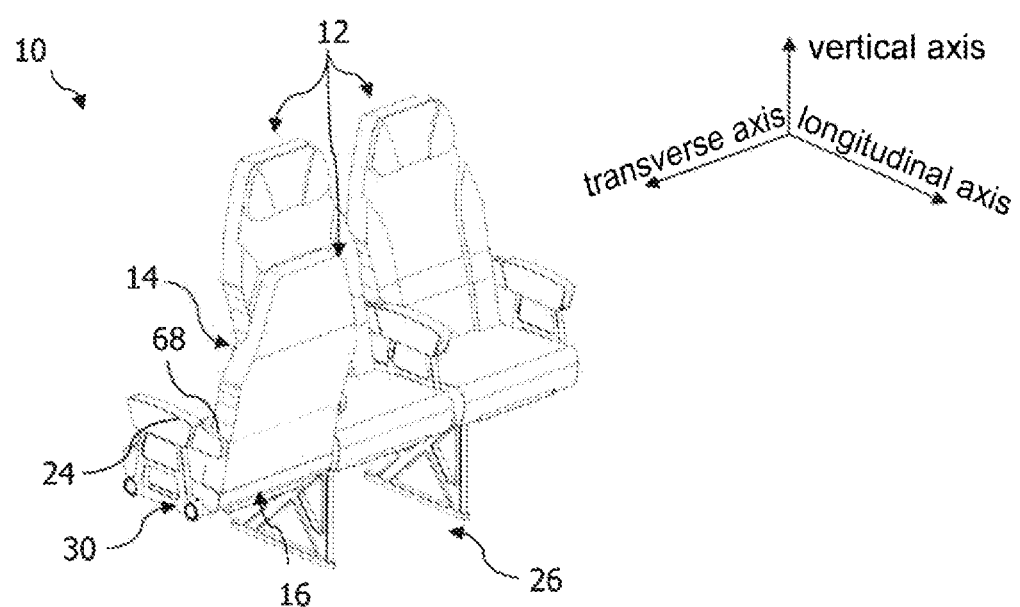
FIG. 3 shows the passenger seat arrangement shown in FIGS. 1 and 2 in a third state.

FIGS. 1 to 3 show a passenger seat arrangement 10 in a state in which it is installed in a passenger cabin of an aircraft, which forms a row of seats in the passenger cabin. The passenger seat arrangement 10 is arranged between further rows of seats in the passenger cabin that are not shown here. The passenger seat arrangement 10 comprises three seat units 12, which are arranged next to one another and respectively form a seat for a passenger.

The seat units 12 respectively comprise a backrest element 14 and a seat element 16. To be more precise, the backrest element 14 comprises a headrest 18 and a backrest area 20 and is preferably pivotable in relation to the seat element 16 between an upright position and a reclined position. For this purpose, the backrest element 14 may have a pivoting mechanism that is not shown here, whereby the backrest element 14 can be at least partly pivotable in relation to the seat element 16. The seat element 16 comprises a seat area 22 for receiving a passenger. Furthermore, the passenger seat arrangement comprises multiple armrest elements 24, each seat unit 12 being assigned two armrest elements 24. In the exemplary embodiment shown here, the passenger seat arrangement 10 comprises four armrest elements 24, armrest elements 24 that are arranged between the seat units 12 being respectively assigned to two seat units 12.

The passenger seat arrangement 10 also comprises a supporting frame 26, which carries the seat units 12 and is connected by way of two supporting feet 28 in a load-transferring manner to a seat rail of the aircraft that is not shown here. The supporting frame 26 comprises three seat mountings 30, which are respectively assigned to a seat unit 12 and are designed to fix the latter to the supporting frame 26 in a load-transferring manner.

The construction of the passenger seat arrangement 10 is specified more precisely hereafter with reference to one of the three seat units 12 and one of the three seat mountings 30. The other seat units 12 and the other seat mountings 30 are formed in a way corresponding to the seat unit 12 and seat mounting 30 described below.

The seat mounting 30 comprises a first backrest holder 32, to which the backrest element 14 of the seat unit 12 can be fixed in a releasable and load-transferring manner in a first position on the seat mounting 30. A backrest element 32 fixed in this first position is shown in FIG. 2. Furthermore, the seat mounting 30 comprises a second backrest holder 34, to which the backrest element 14 can be fixed in a releasable and load-transferring manner in a second position on the seat mounting 30, as shown in FIG. 3.

The backrest element 14 is pivoted in relation to a longitudinal axis of the aircraft in a state in which it is fixed to the first backrest holder 32 relative to a state in which it is fixed to the second backrest holder 34. Specifically, the backrest element 14 is pivoted by 180° about an axis parallel to a vertical axis of the aircraft in the state in which it is fixed to the first backrest holder 32 relative to the state in which it is fixed to the second backrest holder 34. In an alternative embodiment, the backrest element 14 may be pivoted by substantially 90° about the axis parallel to the vertical axis of the aircraft in the state in which it is fixed to the first backrest holder 32 relative to the state in which it is fixed to the second backrest holder 34.

Figure 5:
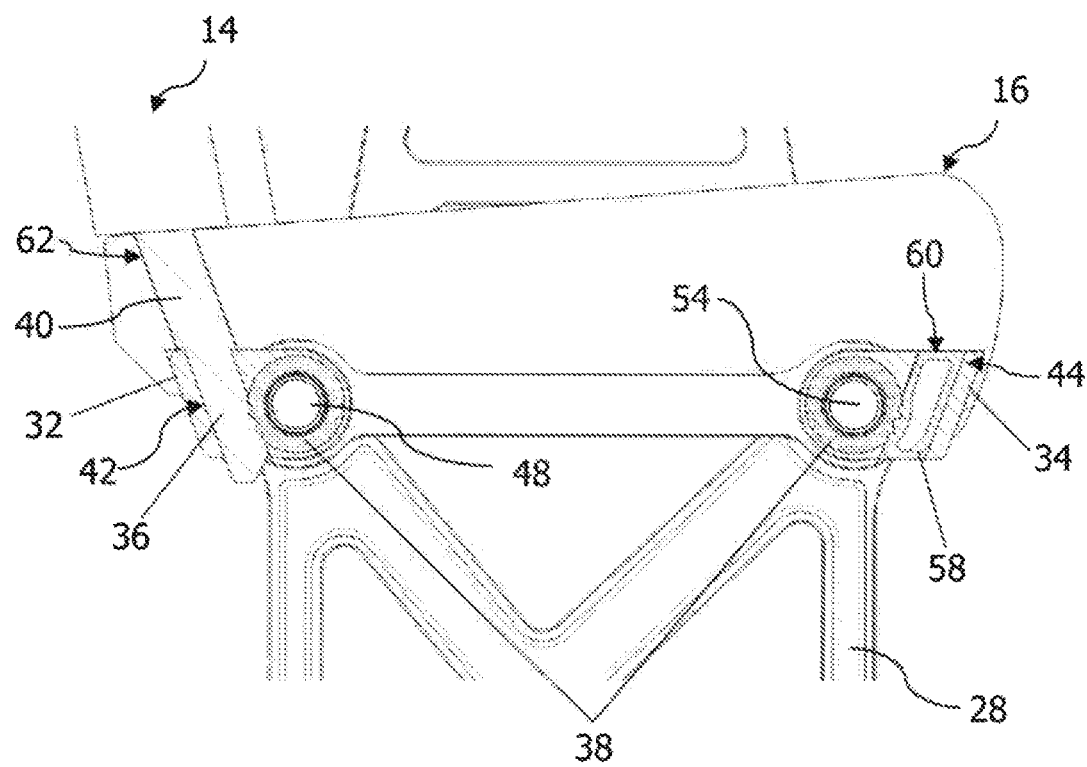
FIG. 5 shows an enlarged cross-sectional view of the seat mounting, the backrest element and a seat element of the passenger seat arrangement.
Figure 6:
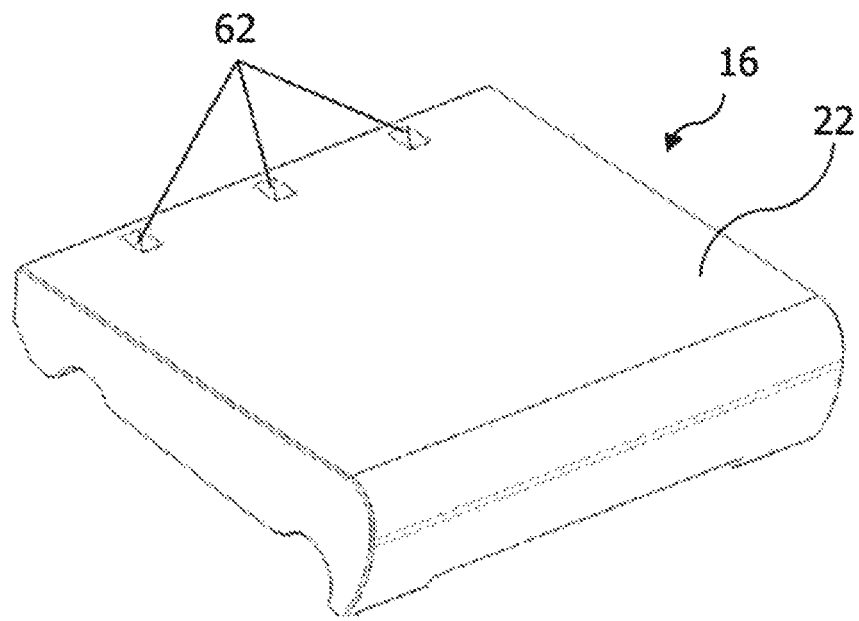
FIGS. 6 and 7 show the seat element of the passenger seat arrangement in a perspective view and a cross-sectional view.
Figure 7:
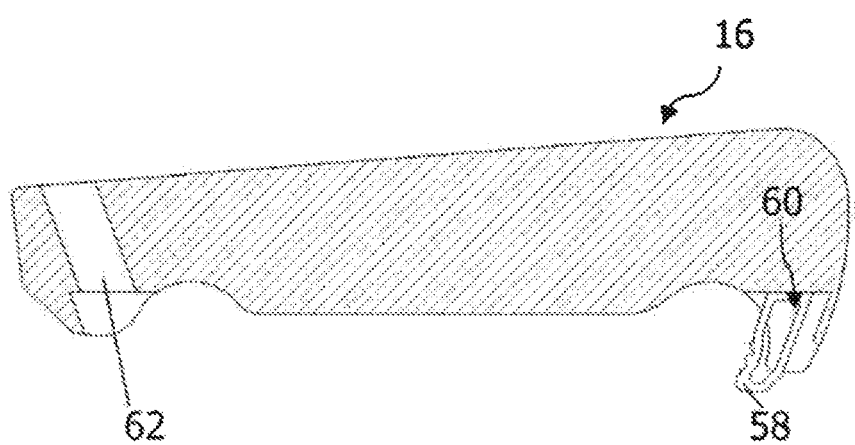
Figure 10:
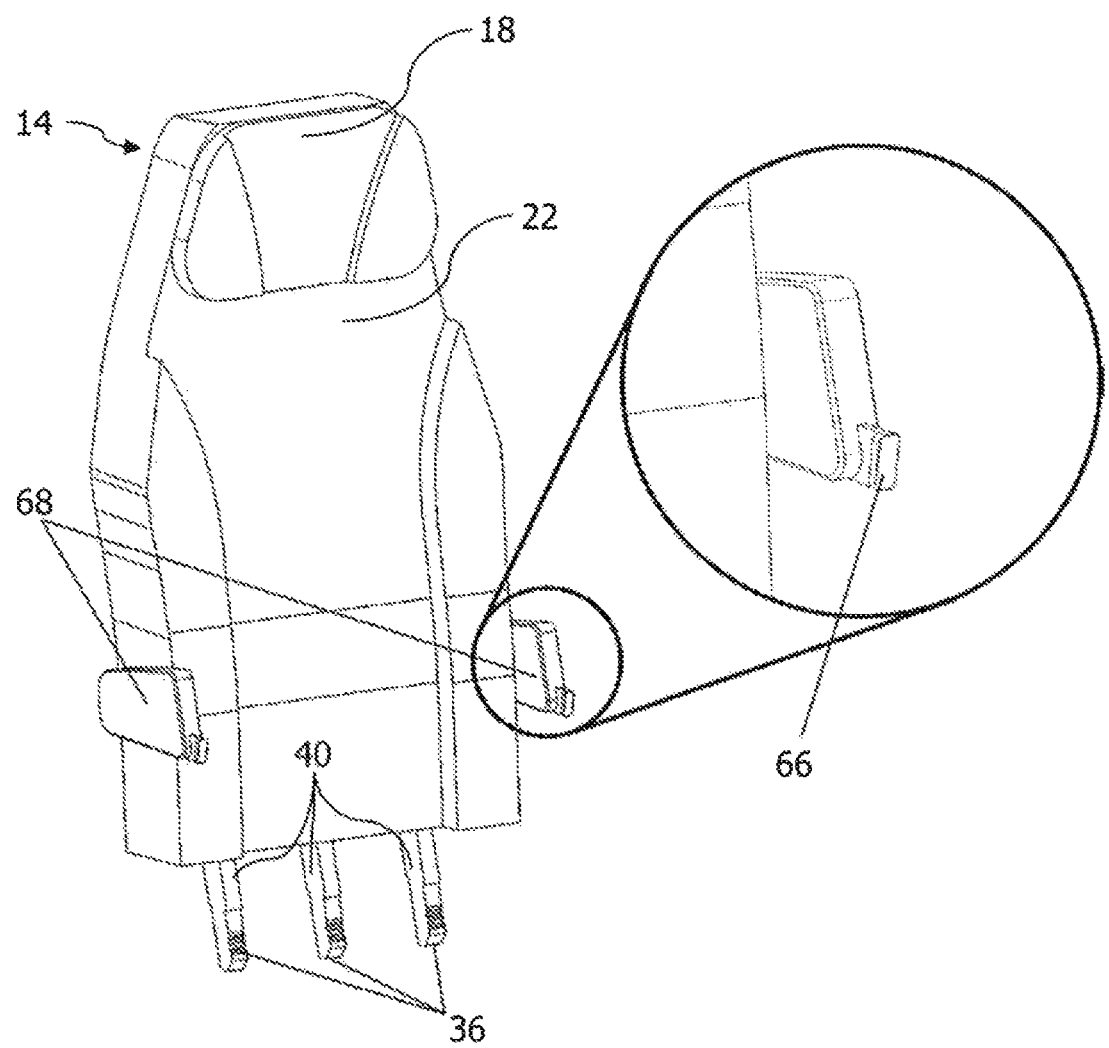
FIG. 10 shows an enlarged view of the backrest element of the passenger seat arrangement.

To provide a releasable and load-transferring connection between the backrest element 14 and the seat mounting 30, the backrest element 14 comprises three first engaging elements 36, as shown in FIGS. 1 and 10. The engaging elements 36 are designed to engage releasably with second engaging elements 38 complementary thereto and respectively formed in the first and the second backrest holder 32, 34, as shown in FIG. 5, in order to fix the backrest element 14 in a load-transferring manner in the first or second position on the seat mounting 30. In other words, both the first backrest holder 32 and the second backrest holder 34 respectively comprise three second engaging elements 38 that are complementary to the first engaging elements 36. The first engaging elements 36 are respectively formed on a connecting strut 40 of the backrest element 14. As shown in FIG. 5, the first engaging elements 36 have multiple engaging teeth, which are arranged one above the other, extend over a width of the respective connecting strut 40 and can be brought into engagement with engaging teeth of the second engaging elements 38 that are complementary thereto.

Figure 4:
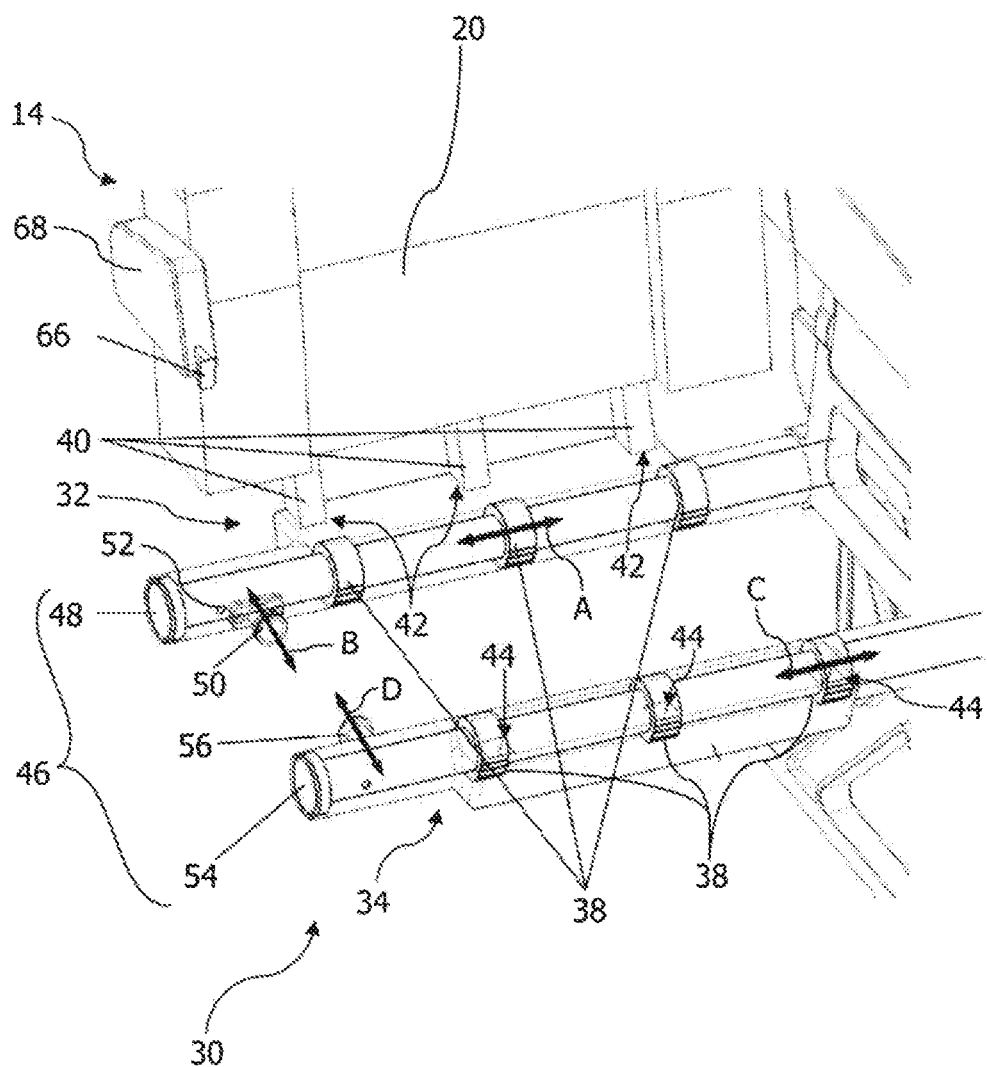
FIG. 4 shows an enlarged view of a seat mounting and a backrest element of the passenger seat arrangement.

FIG. 4 shows an enlarged view of the seat mounting 30, in which a housing of the seat mounting 30 is shown as transparent. As shown in FIG. 4, the first and the second backrest holder 32, 34 are respectively provided with three receiving openings 42, 44, in which a second engaging element 38 is respectively arranged. The receiving openings 42, 44 are formed in such a way that a connecting strut 40 of the backrest element 14 that is formed with the first engaging element 36 can be pushed into them, in order to engage the first engaging elements 36 with the second engaging elements 38 of the first backrest holder 32 or of the second backrest holder 34.

The passenger seat arrangement 10 also comprises a locking mechanism 46 locking the backrest element 14 to the first or the second backrest holder 32, 34. The locking mechanism 46 has the effect that a load-transferring connection between the backrest element 14 and the seat mounting 30 is either maintained or released. To be more precise, the locking mechanism 46 is designed to move the second engaging elements 38 of the first and the second backrest holder 32, 34 between a locking position, in which the second engaging elements 38 of the first and the second backrest holder 32, 34 can be engaged with the first engaging elements 36, and a release position, in which a movement of the first engaging elements 36 in relation to the second engaging elements 38 of the first and the second backrest holder 32, 34 is released.

The first backrest holder 32 has a first locking bolt 48, which is movably mounted in the seat mounting 30 and forms part of the locking mechanism 46. On the first locking bolt 48, the second engaging elements 38 of the first backrest holder 32 are provided in the form of annular discs which enclose the first locking bolt 48 and are arranged at regular intervals thereon in the longitudinal direction of the first locking bolt 48. The multiple engaging teeth of the second engaging elements 38 are formed on a lateral surface of the annular discs. As indicated by the arrow A in FIG. 4, the first locking bolt 48 is movable along its longitudinal direction, i.e., along a transverse direction of the aircraft, in order to move the second engaging elements 38 of the first backrest holder 32 between their locking position and release position.

The locking mechanism 46 also comprises a first blocking element 50, which blocks the second engaging elements 38 of the first backrest holder 32 in their locking position and blocking position and forms part of a blocking mechanism. The first blocking element 50 is movable between a blocking position, in which a movement of the second engaging elements 38 of the first backrest holder 32 between their locking position and release position is blocked, and a release position, in which a movement of the second engaging elements 38 of the first backrest holder 32 between their locking position and release position is released, as indicated by the arrow B in FIG. 4. For this purpose, the first locking bolt 48 comprises two locking elements in the form of clearances 52 on a lateral surface of the first connecting bolt 48 that are spaced apart from one another in the longitudinal direction of the first connecting bolt 48. Correspondingly, the first blocking element 50 has a locking pin that can be brought into engagement with the clearances 52, in order, in its blocking position, to block the first connecting bolt 48, and consequently the second engaging elements 38 of the first backrest holder 32 that are arranged thereon, in their locking position or release position. The first blocking element 50 also comprises a first spring, loading the first blocking element 50 in the direction of its blocking position.

Correspondingly, the second backrest holder 34 has a second locking bolt 54, which is movably mounted in the seat mounting 30 and forms a further part of the locking mechanism 46. On the second locking bolt 54, the second engaging elements 38 of the second backrest holder 34 are provided in the form of annular discs which enclose the second locking bolt 54 and are arranged at regular intervals thereon in the longitudinal direction of the second locking bolt 54. The multiple engaging teeth of the second engaging elements 38 are formed on a lateral surface of the annular discs. As indicated by the arrow C in FIG. 4, the second locking bolt 54 is movable along its longitudinal direction, in order to move the second engaging elements 38 of the second backrest holder 34 between their locking position and release position.

The locking mechanism 46 also comprises a second blocking element 56, which blocks the second engaging elements 38 of the second backrest holder 34 in their locking position and blocking position and forms a further part of the blocking mechanism. The second blocking element 56 is movable between a blocking position, in which a movement of the second engaging elements 38 of the second backrest holder 34 between their locking position and release position is blocked, and a release position, in which a movement of the second engaging elements 38 of the second backrest holder 34 between their locking position and release position is released, as indicated by the arrow D in FIG. 4. For this purpose, the second locking bolt 54 is formed in a way corresponding to the first locking bolt 48 and the second blocking element 56 is formed in a way corresponding to the first blocking element 50.

In a further development, the locking mechanism 46 may comprise at least one spring unit, which loads the first and the second locking bolt 48, 54, and consequently the second engaging elements 38 of the first and the second backrest holder 32, 34 that are arranged thereon, in the direction of their locking position.

As shown in FIGS. 1 and 5, the seat element 16 can be fixed in a releasable and load-transferring manner in a first position on the first backrest holder 32 or in a second position on the second backrest holder 34. The seat element 16 is, in this case, arranged pivoted by 180° about the axis parallel to the vertical axis of the aircraft in a state in which it is fixed to the first backrest holder 32 relative to a state in which it is fixed to the second backrest holder 34. Alternatively, the seat element 16 may be arranged pivoted by 90° about the axis parallel to the vertical axis of the aircraft in the state in which it is installed on the first backrest holder 32 relative to the state in which it is installed on the second backrest holder 34.

The seat element 16 has three third engaging elements 58, which complement the second engaging elements 38 and are designed to engage in a releasable and load-transferring manner with the second engaging elements 38 of the first or second backrest holder 32, 34, in order to fix the seat element 16 in a load-transferring manner in its first or second position on the seat mounting 30. The third engaging elements 58 are respectively formed on one of three connecting struts 60 of the seat element 16. The connecting struts 60 are arranged on an underside of the seat element 16, opposite from the seat area 22, in a peripheral region of the seat element 16. To be more precise, the connecting struts 60 are formed in such a way that they can be pushed into the corresponding receiving openings 42, 44 of the first and the second backrest holder 32, 34, in order to engage the third engaging elements 58 with the second engaging elements 38 of the first or the second backrest holder 32, 34.

In a peripheral region of the seat element 16 arranged opposite from the connecting struts 60, said seat element is provided with at least three clearances 62 in the form of through-openings 62. In an installed state of the backrest element 14 and the seat element 16 on the seat mounting 30, the connecting struts 40 of the backrest element 14 are at least partly accommodated in the through-openings 62 of the seat element 16, as shown in FIG. 5.

Figure 8:
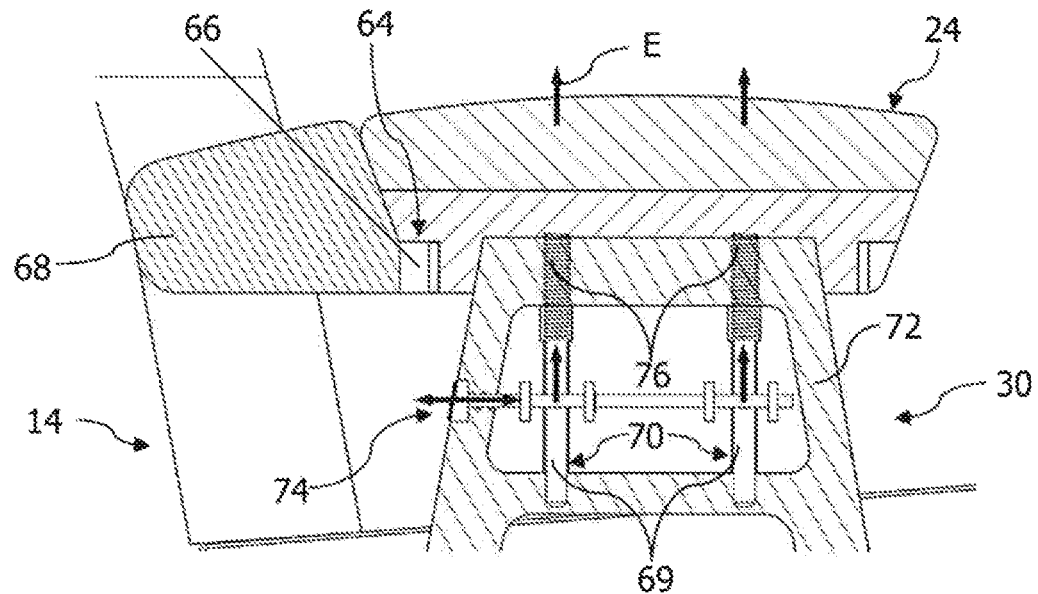
FIGS. 8 and 9 show a cross-sectional view of an armrest element of the passenger seat arrangement in various states.
Figure 9:
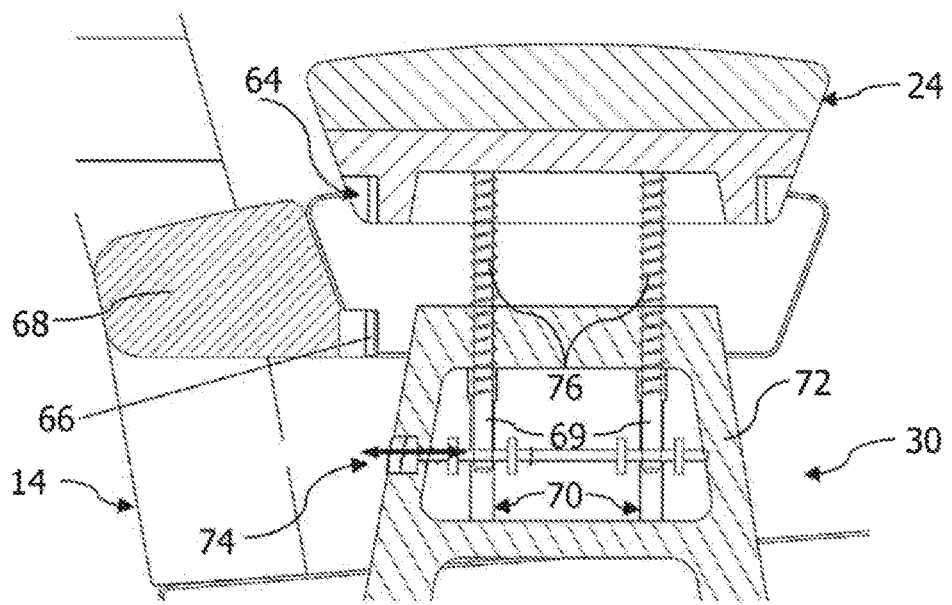

The configuration of the armrest elements 24 is specified more precisely hereafter with reference to FIGS. 8 to 10. The armrest elements 24 are configured and designed in such a way as to be fixed in a releasable and load-transferring manner both to the backrest element 14 and to the seat mounting 30. To be more precise, each of the armrest elements 24 comprises a first connecting element 64, which is designed to engage releasably with a complementary second connecting element 66 attached to the backrest element 14, in order to fix the armrest element 24 on the backrest element in a load-transferring manner. As shown in FIG. 10, the second connecting element 66 takes the form of a fillet or shaped block with a T-shaped cross-sectional form, which can engage with the first connecting element 64 in the form of a T-shaped groove complementary thereto, i.e., a groove with a cross-sectionally T-shaped clearance. The second connecting element 66 is attached to an armrest holder 68 of the backrest element 14. In a state in which they are engaged on one another, the first connecting element 64 and the second connecting element 66 interact in such a way that a rotational movement of the armrest elements 24 in relation to the backrest element 14 is blocked and a translational movement of the armrest elements 24 in relation to the backrest element 14 in the direction of a release position of the armrest element 24 is released. By moving the armrest element 24 in the direction of its release position, the first locking element 64 and the second locking element 66 are released from one another. The direction of the release position is indicated in FIG. 8 by the arrows E. In the present case, in a state of the first and the second connecting element 64, 66 in which they are engaged in one another, the armrest element 24 is movable in a direction away from the seat mounting 30, in order to arrive in its release position.

The armrest element 24 also comprises a third connecting element 69, which is designed to engage releasably with a fourth connecting element 70 attached to the seat mounting, in order to fix the armrest element 24 on the seat mounting 30 in a load-transferring manner. In a state in which they are engaged on one another, the third connecting element 69 and the fourth connecting element 70 interact in such a way that a rotational movement of the armrest element 24 in relation to the seat mounting 30 is blocked and a translational movement of the armrest element 24 in relation to the seat mounting 30 in the direction of the release position of the armrest element 24 is released. By moving the armrest element 24 in the direction of its release position, a release of the third connecting element 69 from the fourth connecting element 70 takes place. Specifically, the third connecting element 69 is provided in the form of two connecting bolts, which can be pushed into receiving openings which are complementary thereto, are formed in an armrest support 72 of the seat mounting 30 and form the fourth connecting element 70.

The armrest element 24 also comprises a further blocking mechanism 74, which blocks a movement of the armrest element 24 in the direction of its release position in a state of the armrest element 24 in which it is fixed to the backrest element 14 and the seat mounting 30. In other words, the further blocking mechanism 74 locks the armrest element 24 in the position fixed to the backrest element 14 and the seat mounting 30. Furthermore, the armrest element 24 comprises a further spring unit 76 which, in a state in which it is installed on the backrest element 14 and the seat mounting 30, loads the armrest element 24 in the direction of its release position. The further spring unit 76 is formed by spiral springs enclosing the connecting bolts of the third connecting element 69.

Figure 11A:
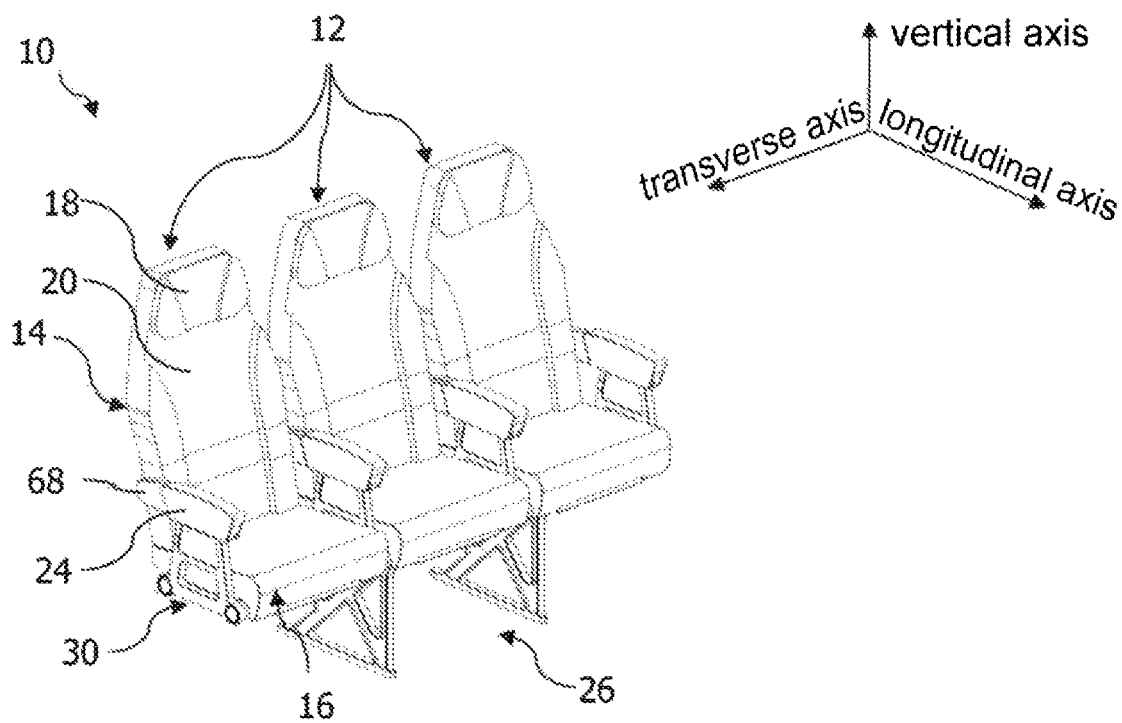
FIGS. 11*a-l* show a method for reconfiguring the passenger seat arrangement shown in FIGS. 1 to 10, FIGS. 12*a-d* show a further embodiment of a passenger seat arrangement and a method for reconfiguring the same.
Figure 11B:
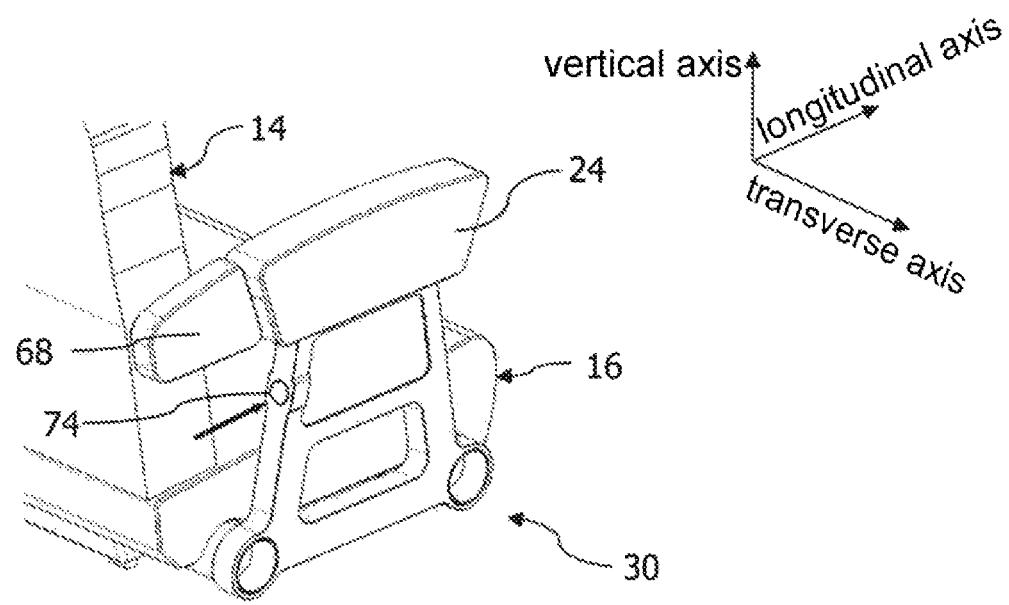
Figure 11C:
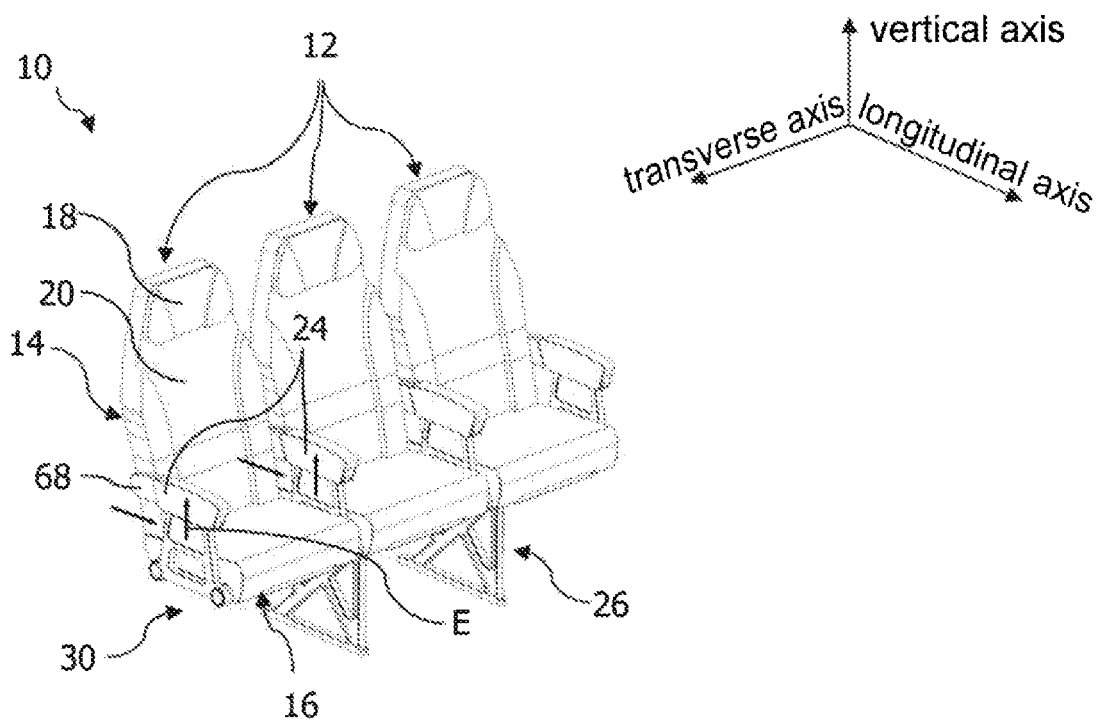
Figure 11D:
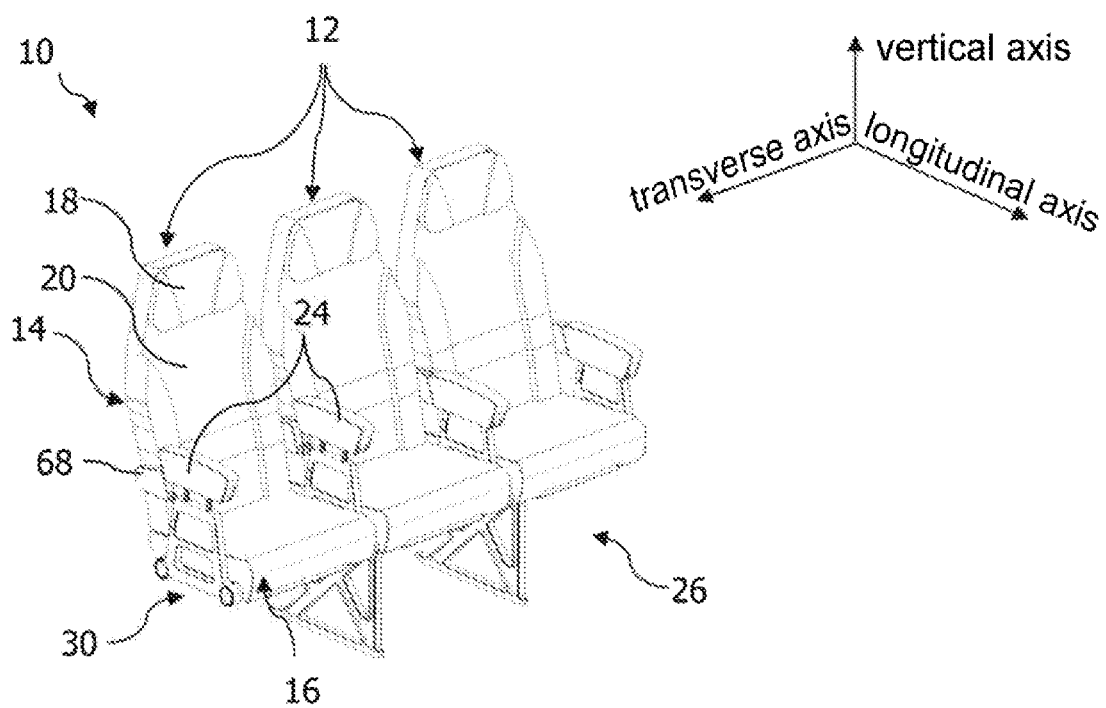

A method for reconfiguring the passenger seat arrangement 10 is specified hereafter with reference to FIGS. 11a to 11l. This is based on one of the three seat units 12 by way of example. FIG. 11a shows the passenger seat arrangement 10 in a first state, in which the individual seat units 12 are respectively oriented in the longitudinal direction of the aircraft. The backrest and armrest elements 14, 24 are firmly connected to the respective seat mounting 30. In a first step, as shown in FIGS. 11b and 11c, a release of the armrest elements 24 assigned to the seat unit 30 takes place. For this purpose, for each armrest element 24 to be released, in each case the further blocking mechanism 74 is actuated, in order to release the locking of the armrest element 24 in its position fixed to the seat mounting 30, and thus release a movement of the armrest element 24 in the direction of its release position. Correspondingly, in the step shown in FIG. 11d, a movement of the armrest elements 24 into the respective release position takes place, in order to release them from the backrest element 14 and the seat mounting 30.

Figure 11E:
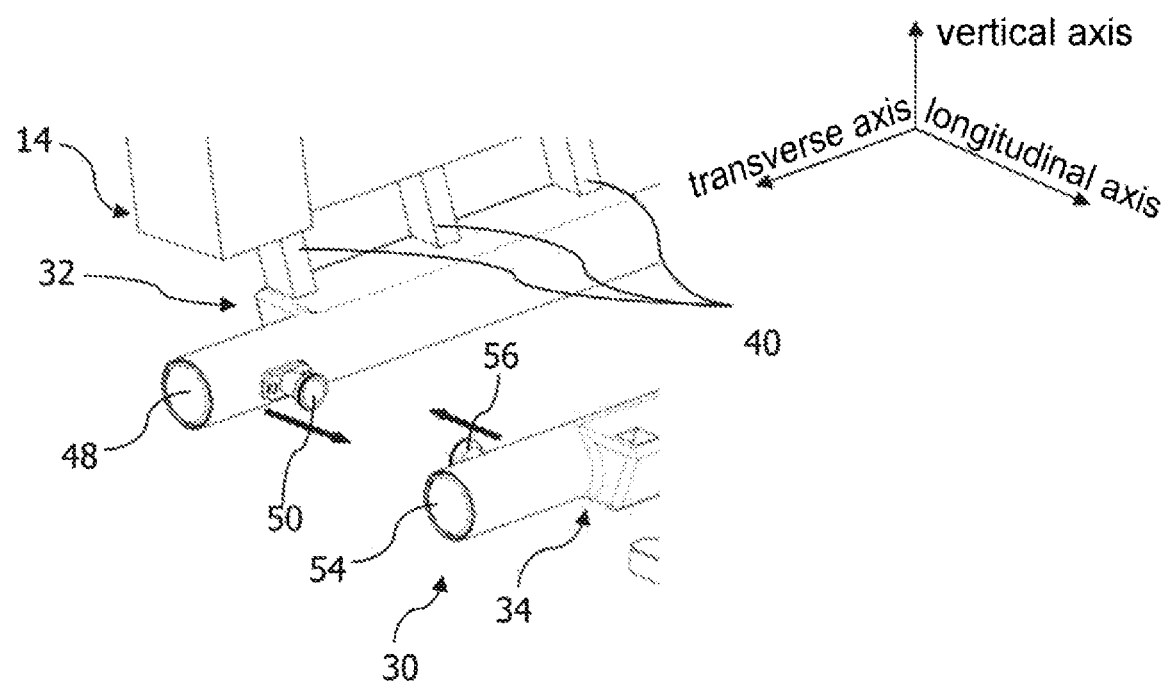

Then, the first and the second blocking element 50, 56 are moved out of their blocking position in the direction of their release position, as shown in FIG. 11e, so that a locking of the first and the second connecting bolt 48, 54 is released. In FIG. 11e, the seat element 16 is not shown for reasons of overall clarity. Correspondingly, in a next step, a movement of the first and the second locking bolt 48, 54 in the direction of their release position takes place, in order to release the load-transferring connection between the second engaging elements 38 of the first backrest holder 32 and the first engaging elements 36 of the backrest element 14 and also between the second engaging elements 38 of the second backrest holder 34 and the third engaging elements 58 of the seat element 16.

Figure 11F:
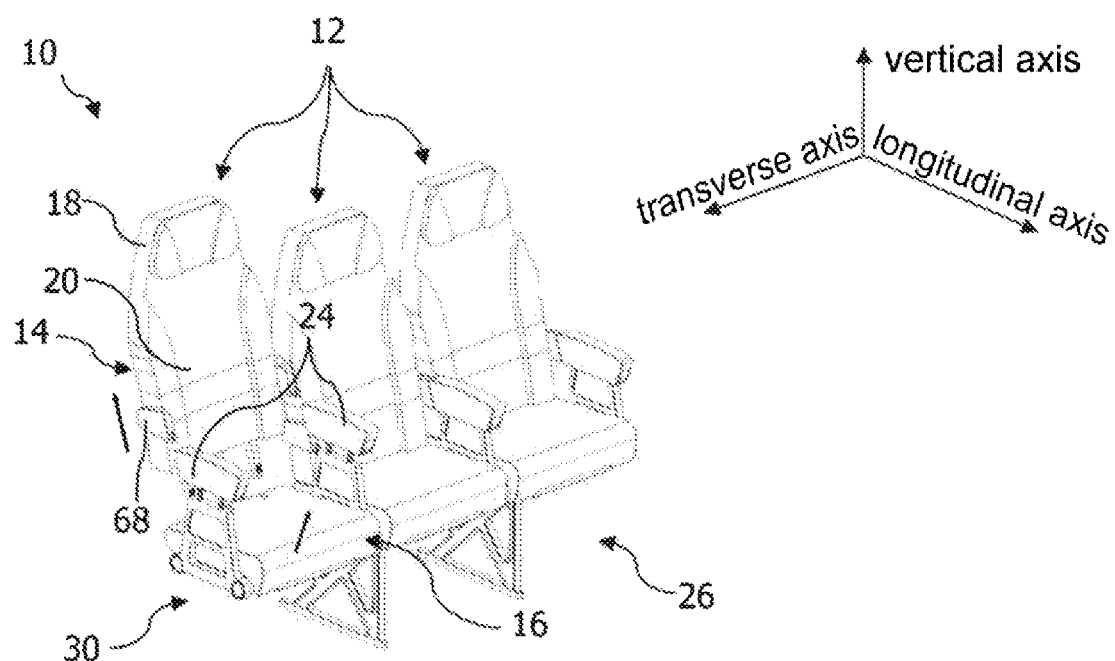
Figure 11G:
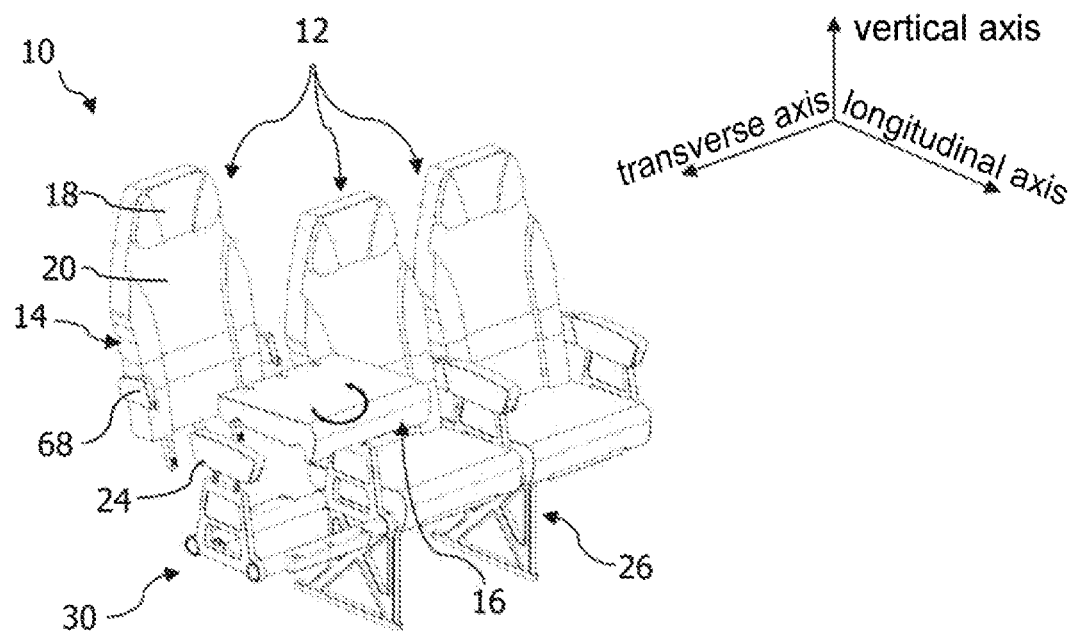
Figure 11H:
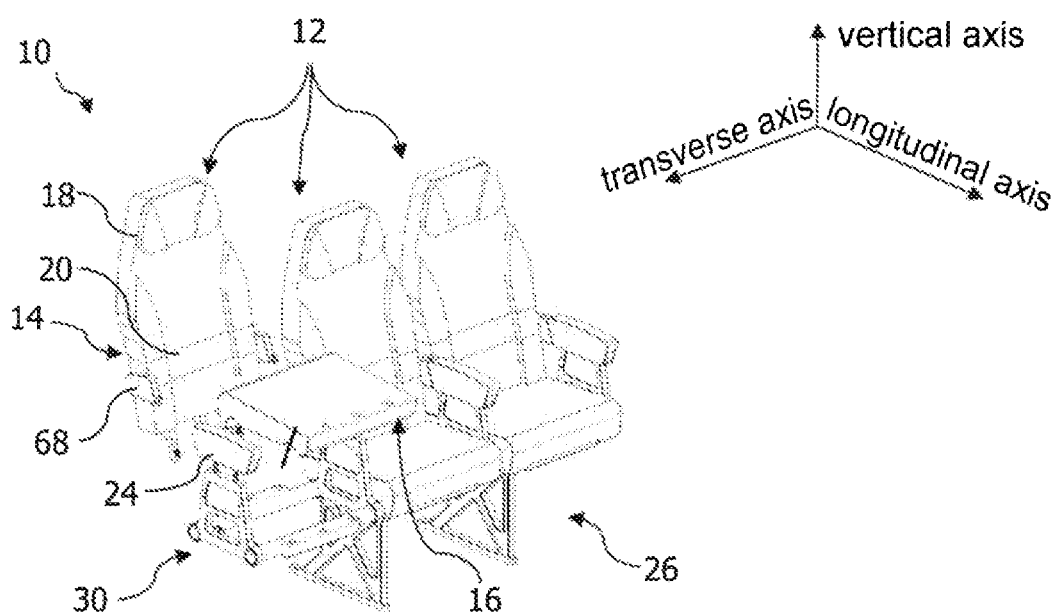

In a further step, a movement of the backrest element 14 in a direction away from the seat mounting 30 takes place, so that the connecting struts 40 of the backrest element 14 that have the first engaging elements 36 are drawn out from the receiving openings 42 of the first backrest holder 32 and the through-opening 62 of the seat element 16, as shown in FIG. 11f. Then, the seat element 16 is moved in the direction away from the seat mounting 30, so that the third engaging elements 58 of the seat element 16 are drawn out from the receiving openings 44 of the second backrest holder, as shown in FIG. 11g. The seat element 16 is turned by 180° about the axis parallel to the vertical axis of the aircraft and fixed to the first backrest holder 32, by the third engaging elements 58 being pushed into the receiving openings 42 of the first backrest holder 32, as shown in FIGS. 11h and 11i.

Figure 11I:
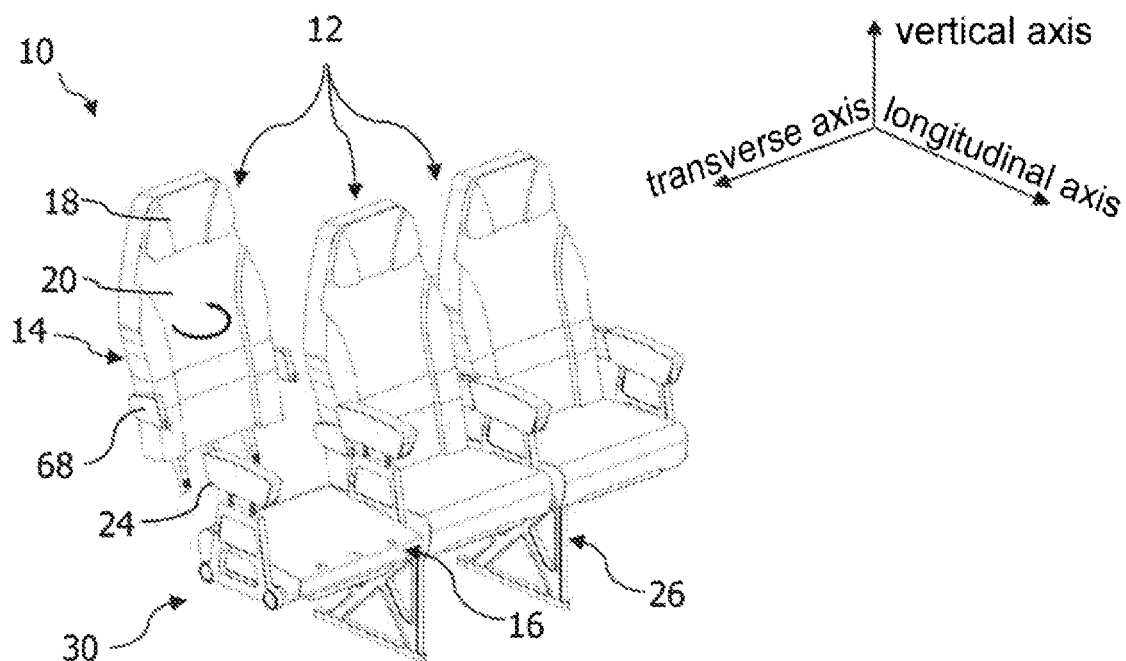
Figure 11J:
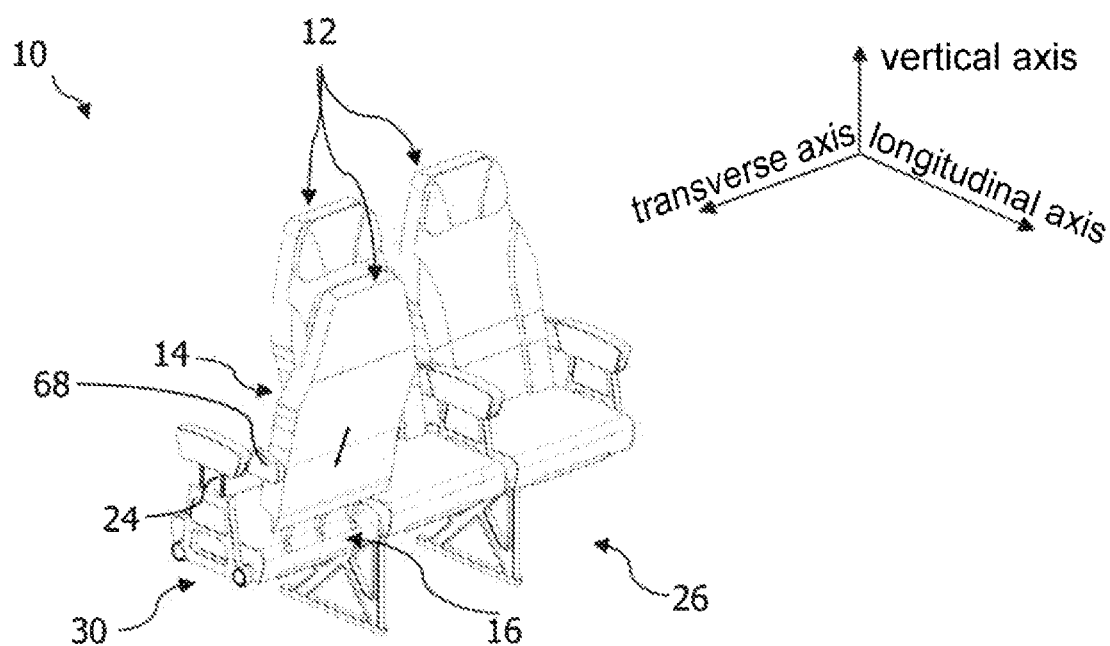
Figure 11K:
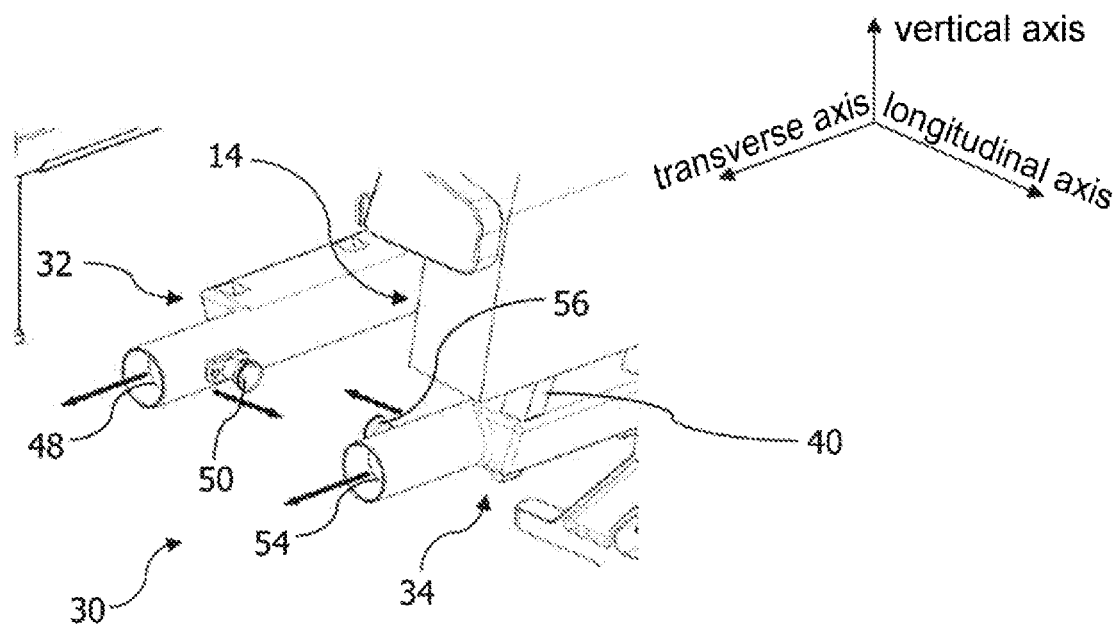
Figure 11L:
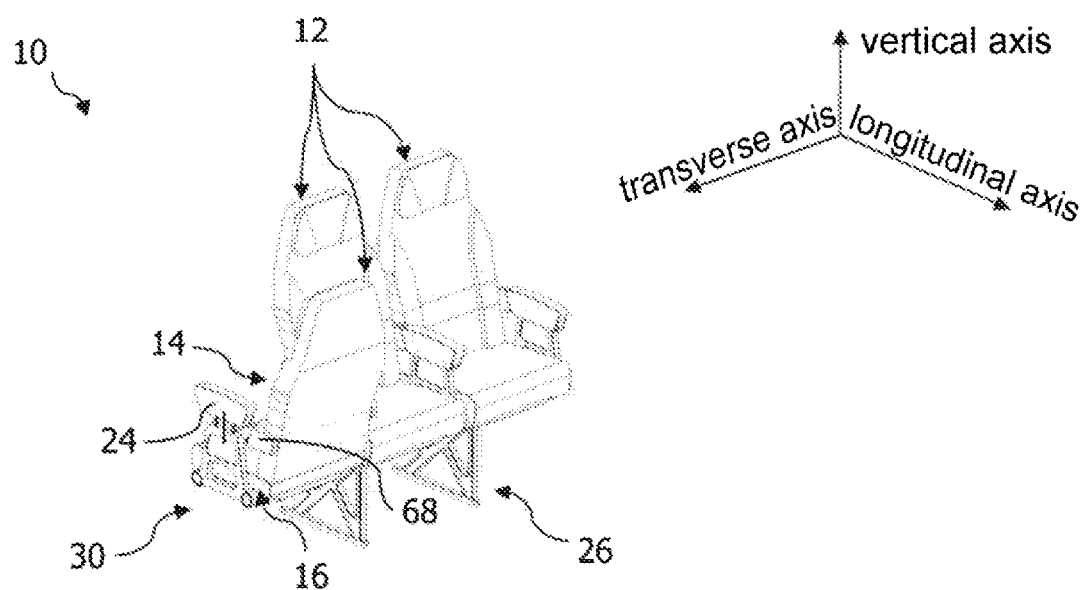

In a next-following step, the backrest element 14 is turned by 180° about the axis parallel to the vertical axis of the aircraft and fixed to the second backrest holder 32 of the seat mounting 30, as shown in FIGS. 11i and 11j. This takes place by the connecting struts 40 of the backrest element 14 being pushed by way of the through-openings 62 of the seat element 16 into the receiving openings 44 of the second backrest holder 34. In order to engage the second engaging elements 38 respectively with the first engaging elements 36 of the backrest element 14 and the third engaging elements 58 of the seat element 16, the first and the second locking bolt 48, 54 are moved in the direction of their locking position and blocked in this position by means of the first and the second blocking element 50, 56. This step is illustrated in FIG. 11k, which shows an enlarged view of the seat mounting 30, the seat element 16 not being shown for reasons of overall clarity. Finally, a fixing of the armrest elements 24 to the seat mounting 30 and the backrest element 24, as shown in FIG. 11l, and a blocking of the same in this position by means of the further blocking mechanism 74 take place.

Figure 12A:
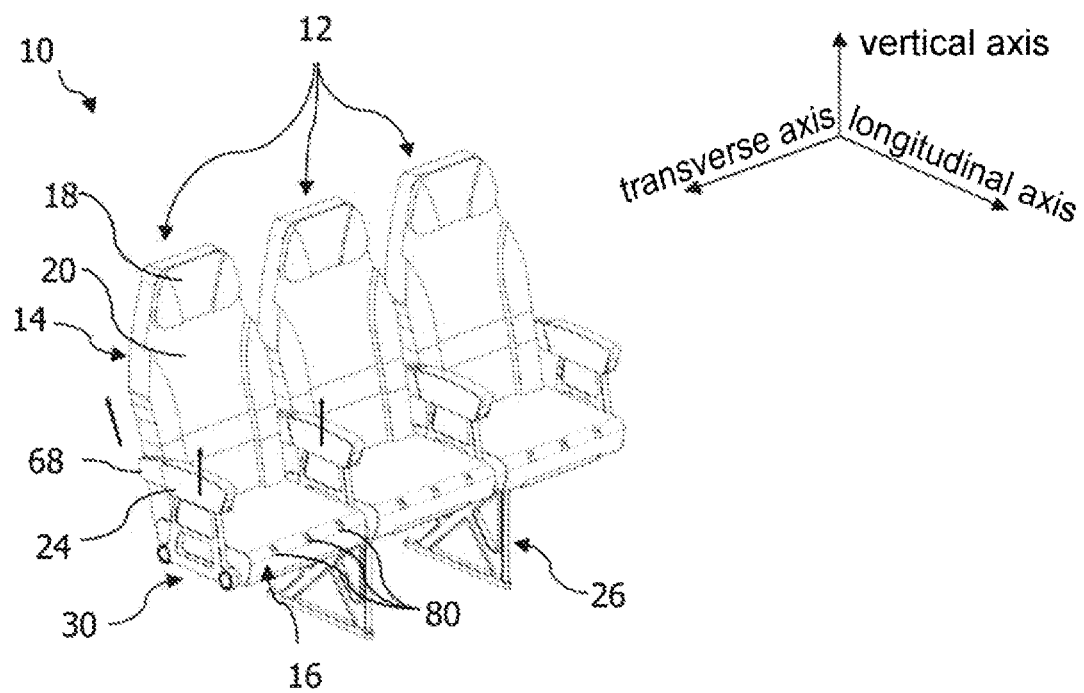
Figure 12B:
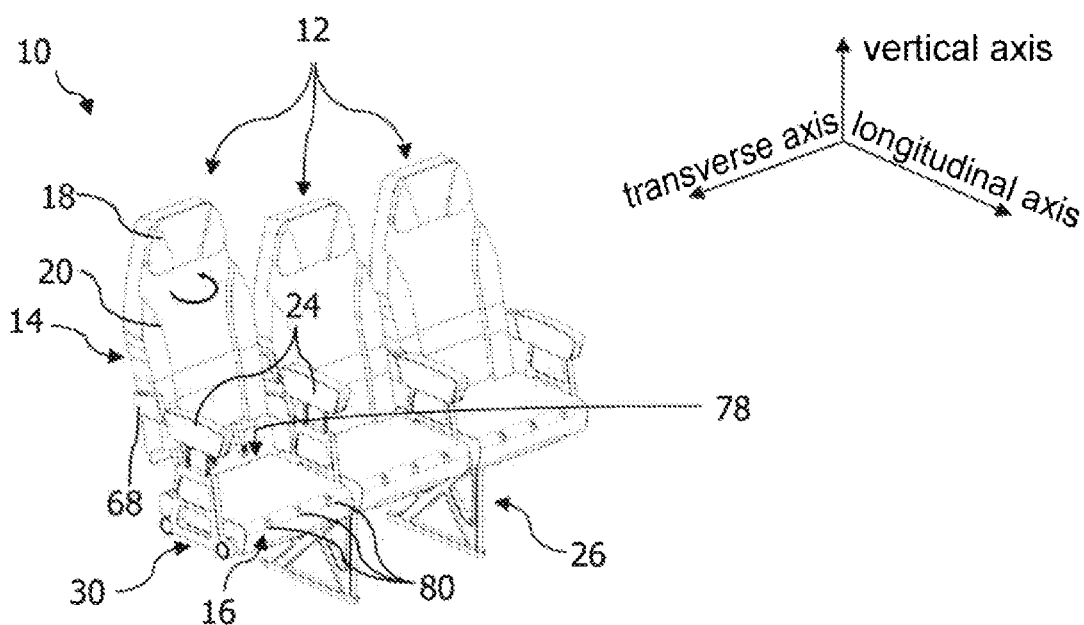
Figure 12C:
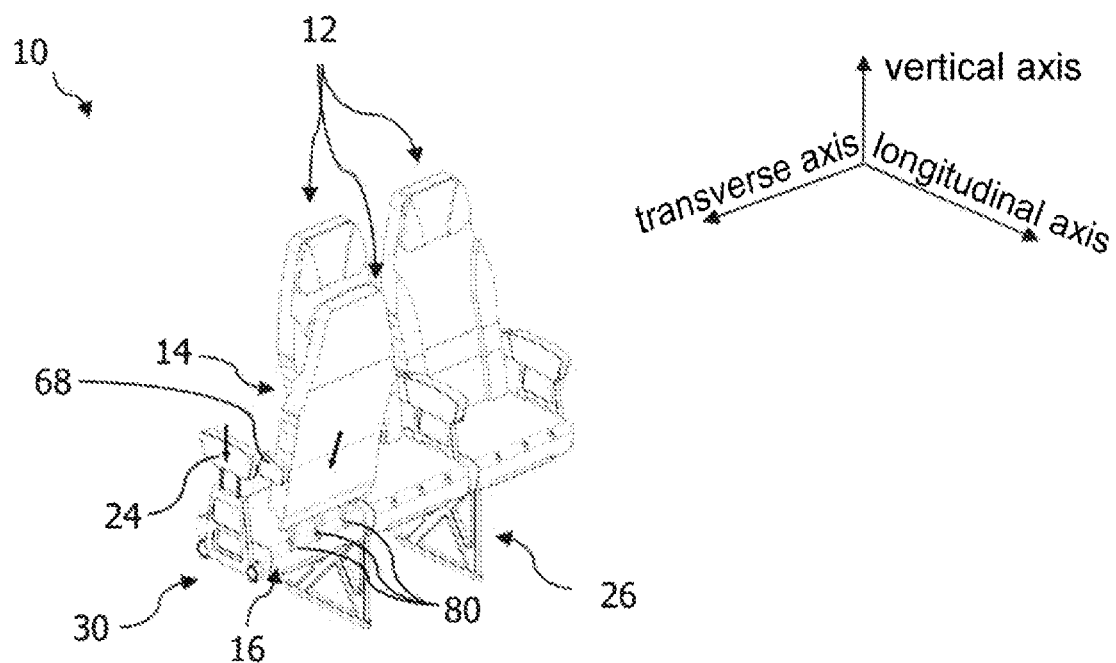
Figure 12D:
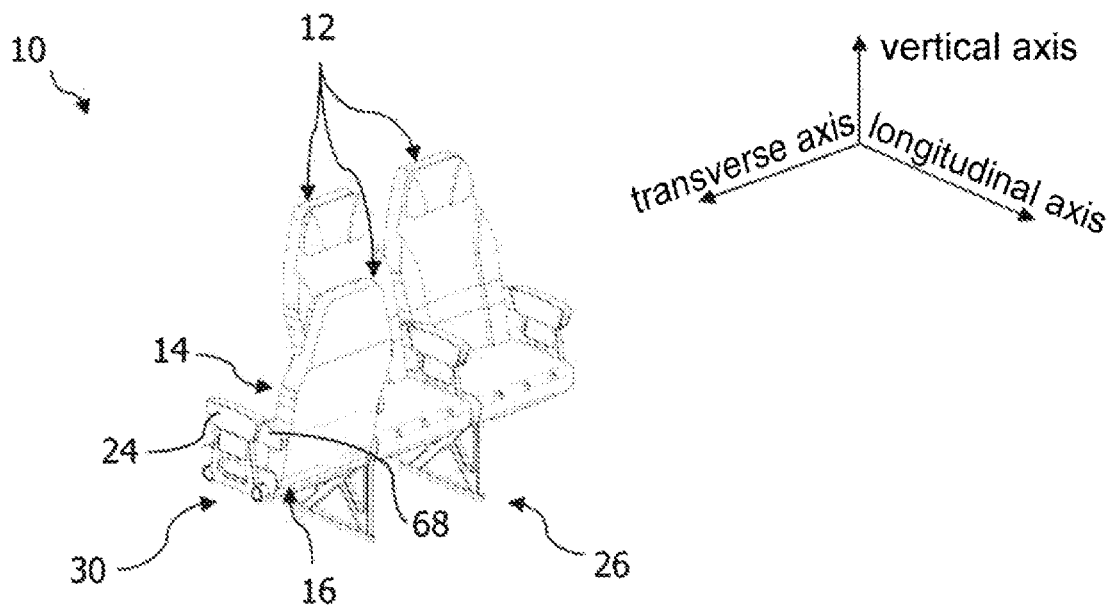
Figure 13:
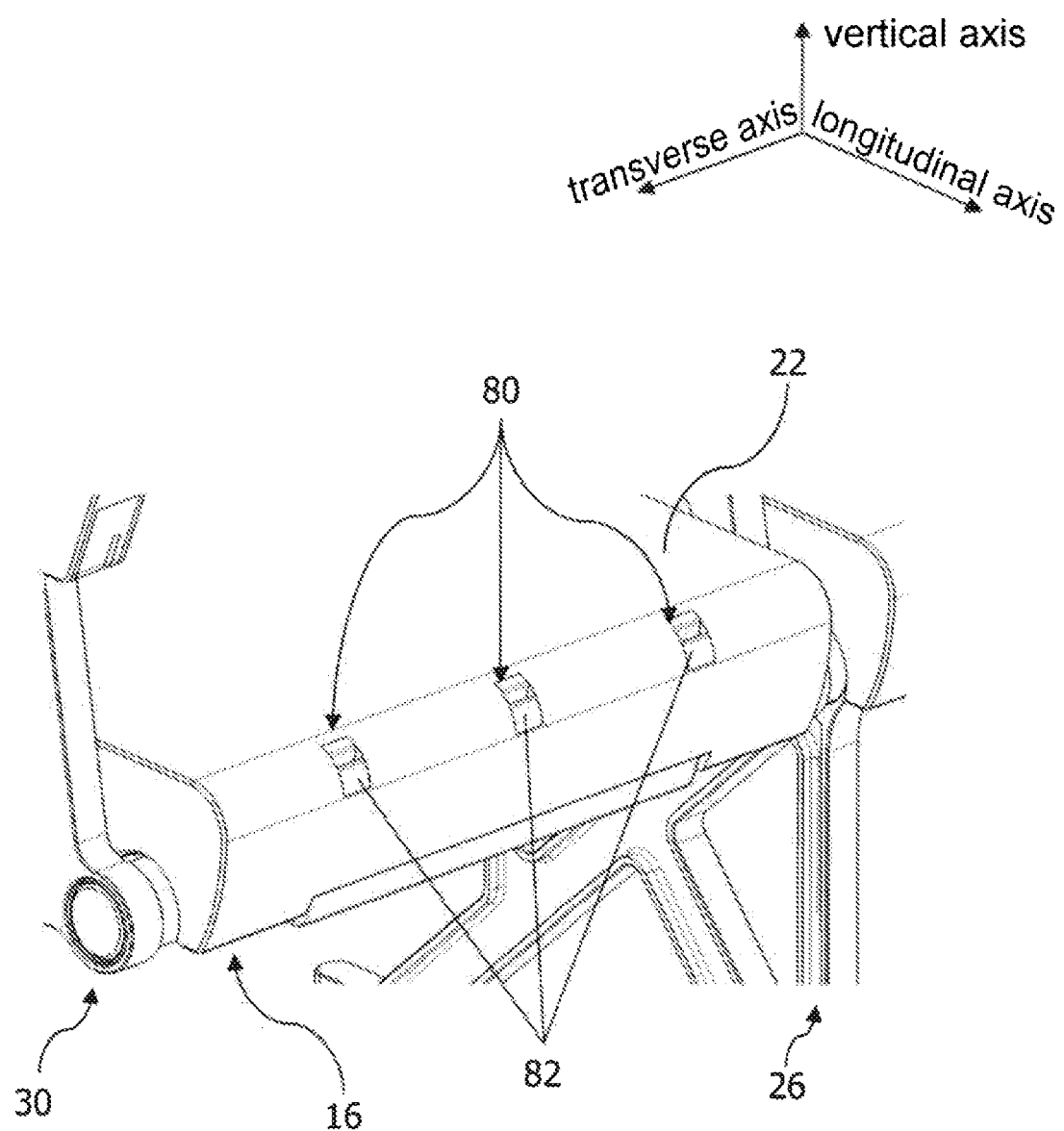
FIG. 13 shows an enlarged view of a seat element of the passenger seat arrangement shown in FIGS. 12*a-d*, FIGS. 14 to 16 show various configurations of the passenger seat arrangement.

FIGS. 12a to 13 show a further embodiment of the passenger seat arrangement 10, in which a repositioning of the backrest element 14 from the first into the second position and vice versa does not require any conversion of the seat element 16. For this purpose, the seat element 16 is provided in the region of the backrest holder 32 with three first clearances 78 in the form of through-openings, by way of which the connecting struts 40 of the backrest element 14 can be pushed into the receiving openings 42 of the first backrest holder 32. In other words, in an installed state of the backrest element 14 on the first backrest holder 32, the connecting struts 40 of the backrest element 14 are partly accommodated in the first clearances 78 of the seat element 16. Furthermore, the seat element 16 is provided in the region of the second backrest holder 34 with three second clearances 80 in the form of through-openings, by way of which the connecting struts 40 of the backrest element 14 can be pushed into the receiving openings 44 of the second backrest holder 34. In other words, in an installed state of the backrest element 14 on the second backrest holder 34, the connecting struts 40 of the backrest element 14 are partly accommodated in the second clearances 80 of the seat element 16.

The seat element 16 also comprises multiple closure flaps 82, see FIG. 13, which are respectively arranged in an opening of the multiple first or second clearances 78, 80 in the region of the seat area 22 of the seat element 16. The closure flaps 82 are movable between a closure position, in which the respective opening of the first or second clearance 78, 80 is closed, and a release position, in which the respective opening of the first or second clearance 78, 80 is released.

A method for reconfiguring the passenger seat arrangement 10 of the second embodiment is specified hereafter with reference to FIGS. 12a to 12d. In a first step, a release and movement of the armrest elements 24 into their release position and a release of the backrest element 14 from the first backrest holder 32 take place in a way corresponding to the method shown in FIGS. 11a to 11l. Then, the backrest element 14 is pivoted by 180° about the axis parallel to the vertical axis of the aircraft and fixed to the second backrest holder 34 in the second position. For this purpose the connecting struts 40 of the backrest element 14 are pushed by way of the second clearances 80 of the seat element 16 into the receiving openings 44 of the second backrest holder 34. In a further step, the first engaging elements 36 of the backrest element 14 that are formed on the connecting strut 40 are engaged with the second engaging elements 38 that are provided in the receiving openings 44 of the second backrest holder 34, in order to connect the backrest element 14 to the seat mounting 30 in a load-transferring manner. Finally, a fixing of the armrest elements 24 to the seat mounting 30 takes place.

Figure 14:
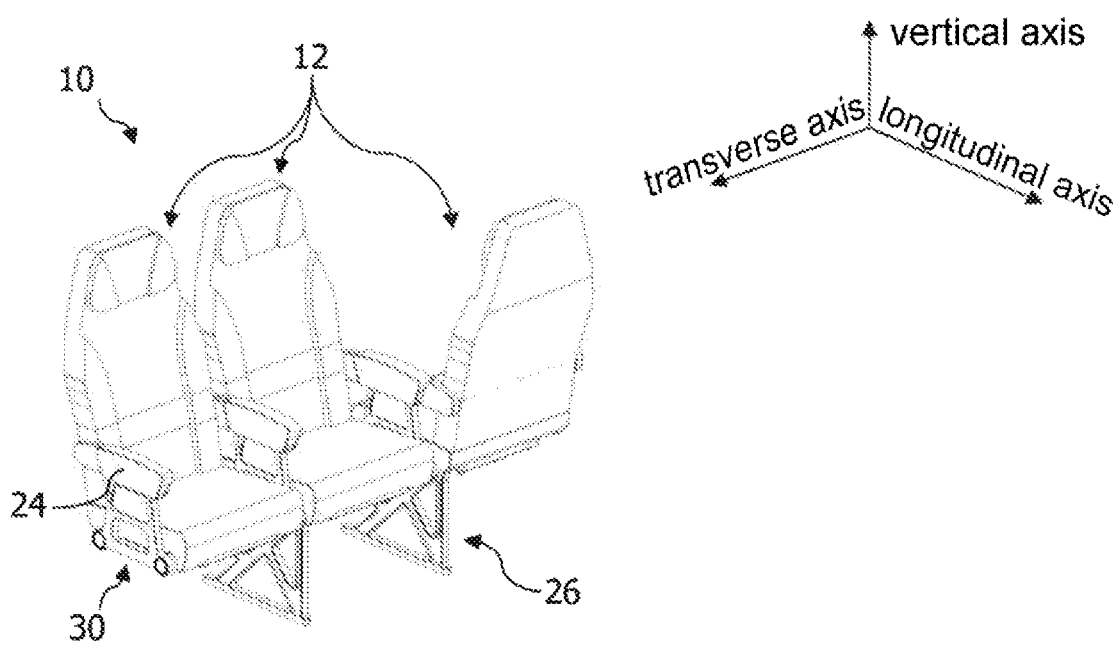
Figure 15:
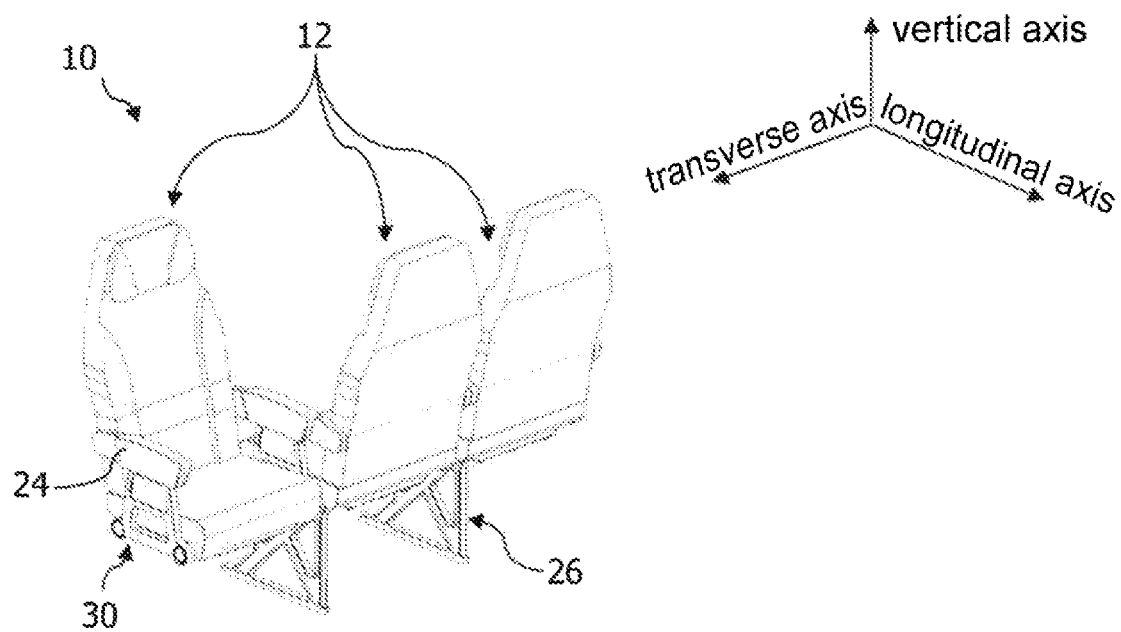
Figure 16:
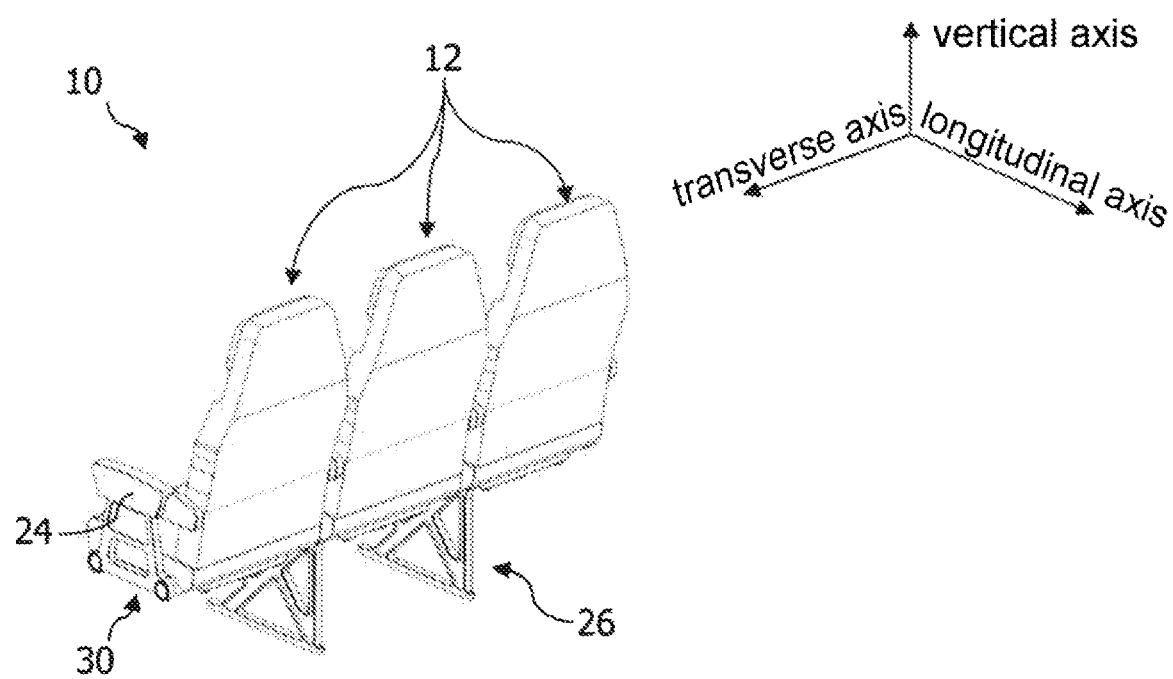

FIGS. 14 to 16 show various configurations of the passenger seat arrangement 10, in which the individual seat units 12 have different alignments with reference to the longitudinal direction of the aircraft.

Figure 17:
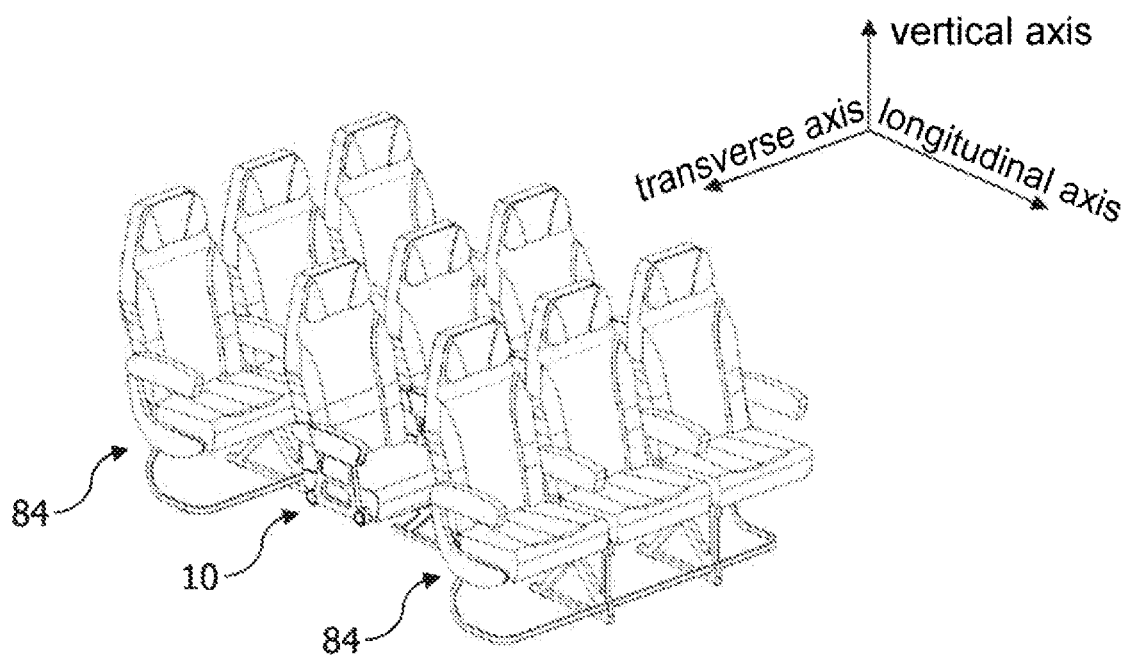
FIGS. 17 to 20 show an aircraft cabin area with a passenger seat arrangement of different configurations.
Figure 18:
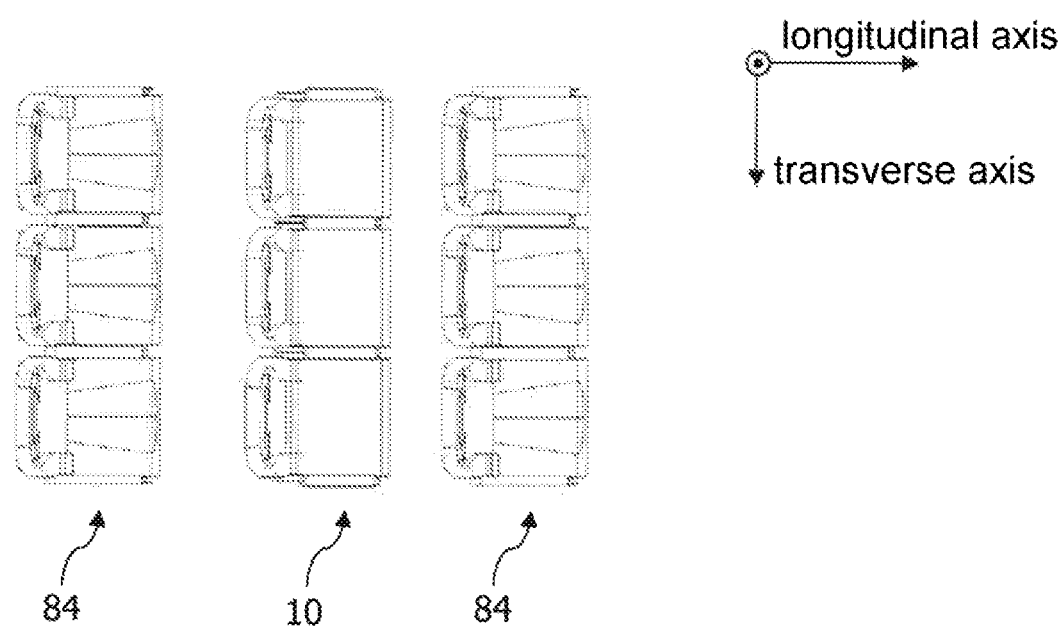
Figure 19:
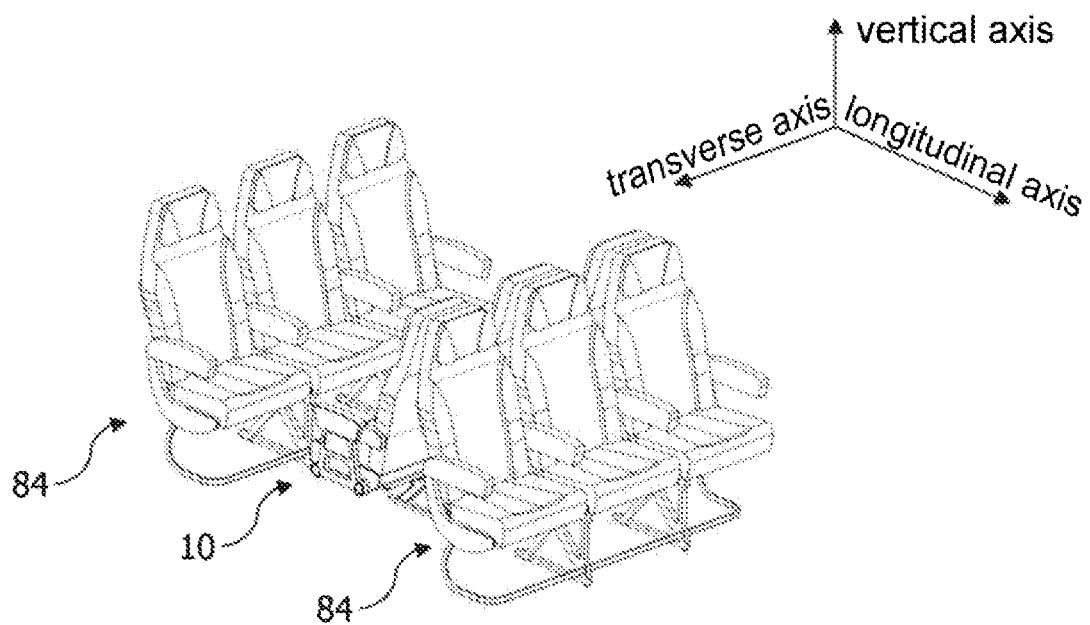
Figure 20:
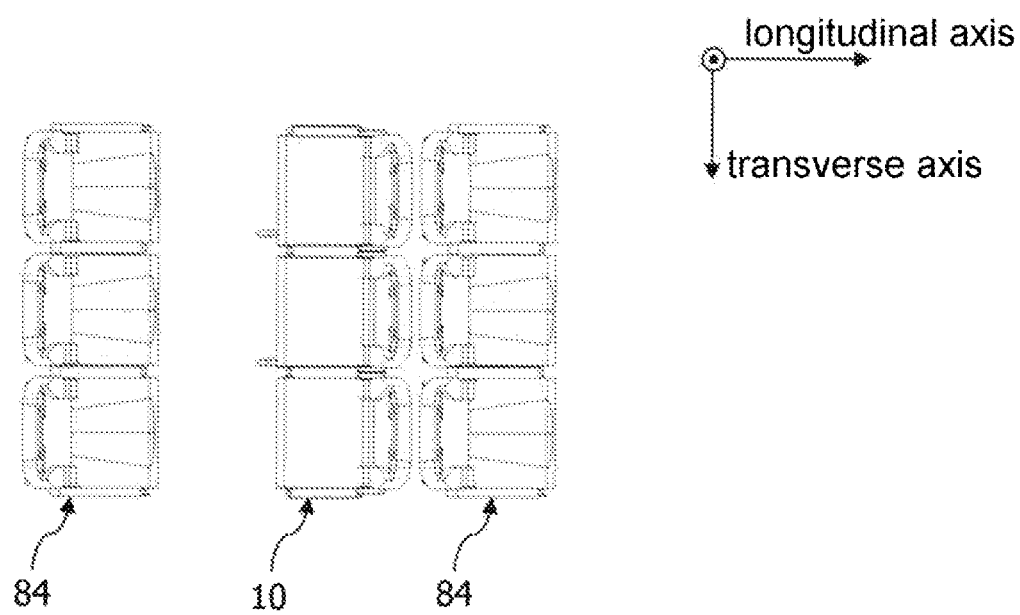

FIGS. 17 to 20 show an aircraft cabin area of different configurations respectively in a perspective view and a plan view. The aircraft cabin area comprises the passenger seat arrangement 10 according to the invention, which is fixed between two further passenger seat arrangements 84 in the aircraft cabin in the longitudinal direction of the aircraft. Depending on the configuration, the seat units 12 of the passenger seat arrangement 10 have different alignments with respect to the longitudinal direction of the aircraft. Specifically, FIGS. 17 and 18 show a first configuration of the aircraft cabin area in which the individual seat units of the passenger seat arrangement 10 and the further passenger seat arrangement 84 arranged one behind the other are respectively aligned in the longitudinal direction of the aircraft. The seat units 12 of the passenger seat arrangement 10, in this case, form a normal seating area, which is preferably set up during landing and takeoff of the aircraft. A second configuration of the aircraft cabin area, in which the seat units 12 of the passenger seat arrangement 10 are aligned counter to the longitudinal direction of the aircraft, is shown in FIGS. 19 to 20. In this way, an alternatively used seating area, in which passengers sit opposite one another in the aircraft cabin, is formed. The configuration of the passenger seat arrangement 10 allows that a conversion from the first to the second configuration of the aircraft cabin area can be performed during flight operation of the aircraft by flight personnel.

FIGS. 21a to 21h show a method for installing a passenger seat system. The passenger seat system comprises the passenger seat arrangement 10 according to the invention, which can be connected in a load-transferring manner by way of the supporting frame 26 to a seat rail 86 in a passenger cabin of the aircraft. The passenger seat system also comprises a table arrangement 88, which, in an installed state of the passenger seat arrangement 10, can be connected in a load-transferring manner to the seat rail 86 of the aircraft in front of the passenger seat arrangement 10 in a longitudinal direction of the aircraft.

In a first step, the passenger seat arrangement 10 according to the invention is installed in a first position behind a further passenger seat arrangement 84, in the longitudinal direction of the aircraft, and in front of a monument 90 arranged in the passenger cabin. This takes place by connecting the supporting frame 26 of the passenger seat arrangement 10 to the seat rail 86 in a load-transferring manner. The passenger seat arrangement 10 has a first configuration, in which the seat units 12 are aligned in the longitudinal direction of the aircraft. This state of the passenger seat arrangement 10 is preferably set up during landing and takeoff of the aircraft.

In a further step, a release of the load-transferring connection between the passenger seat arrangement 10 and the seat rail 86 takes place. Then, the passenger seat arrangement 10 is displaced in the longitudinal direction of the aircraft into a second position and once again connected in a load-transferring manner to the seat rail 86, as shown in FIGS. 24a and 24b. A distance between the passenger seat arrangement 10 and the further passenger seat arrangement 84 is greater in the second position than in the first position. Correspondingly, a distance between the passenger seat arrangement 10 and the monument 90 is less in the second position than in the first position.

Figure 21A:
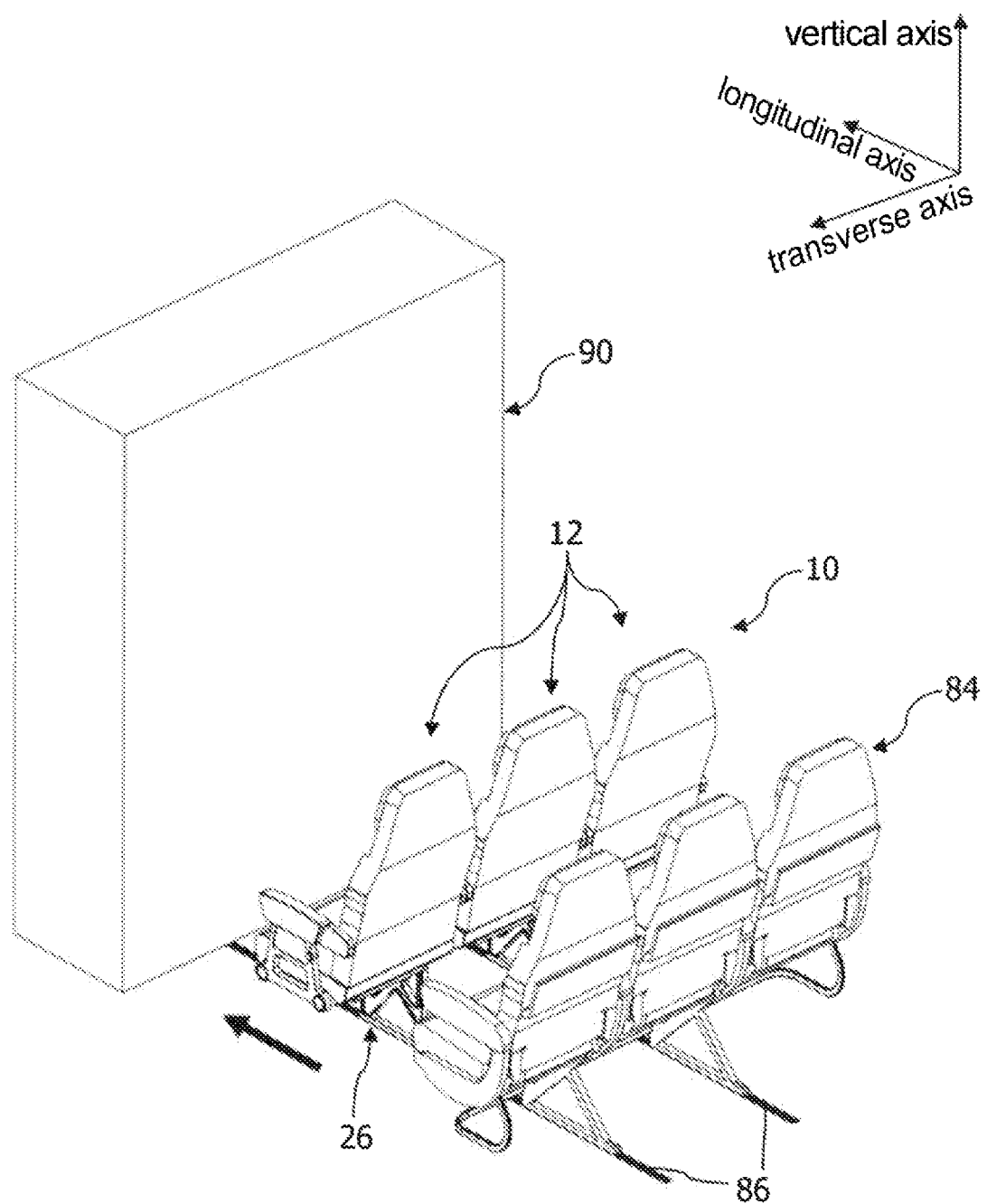
FIGS. 21*a-h* show a passenger seat system and a method for installing the same.
Figure 21B:
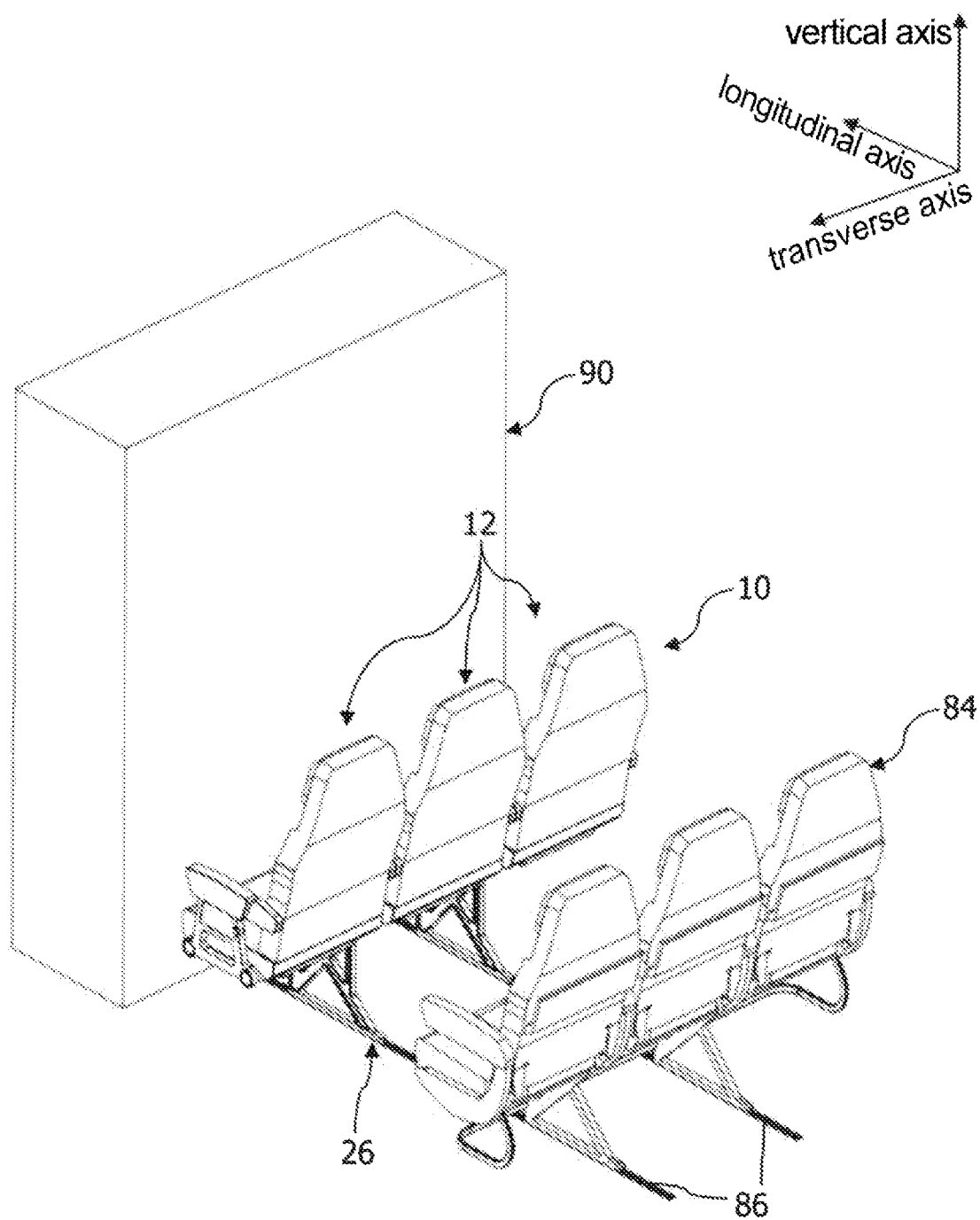
Figure 21C:
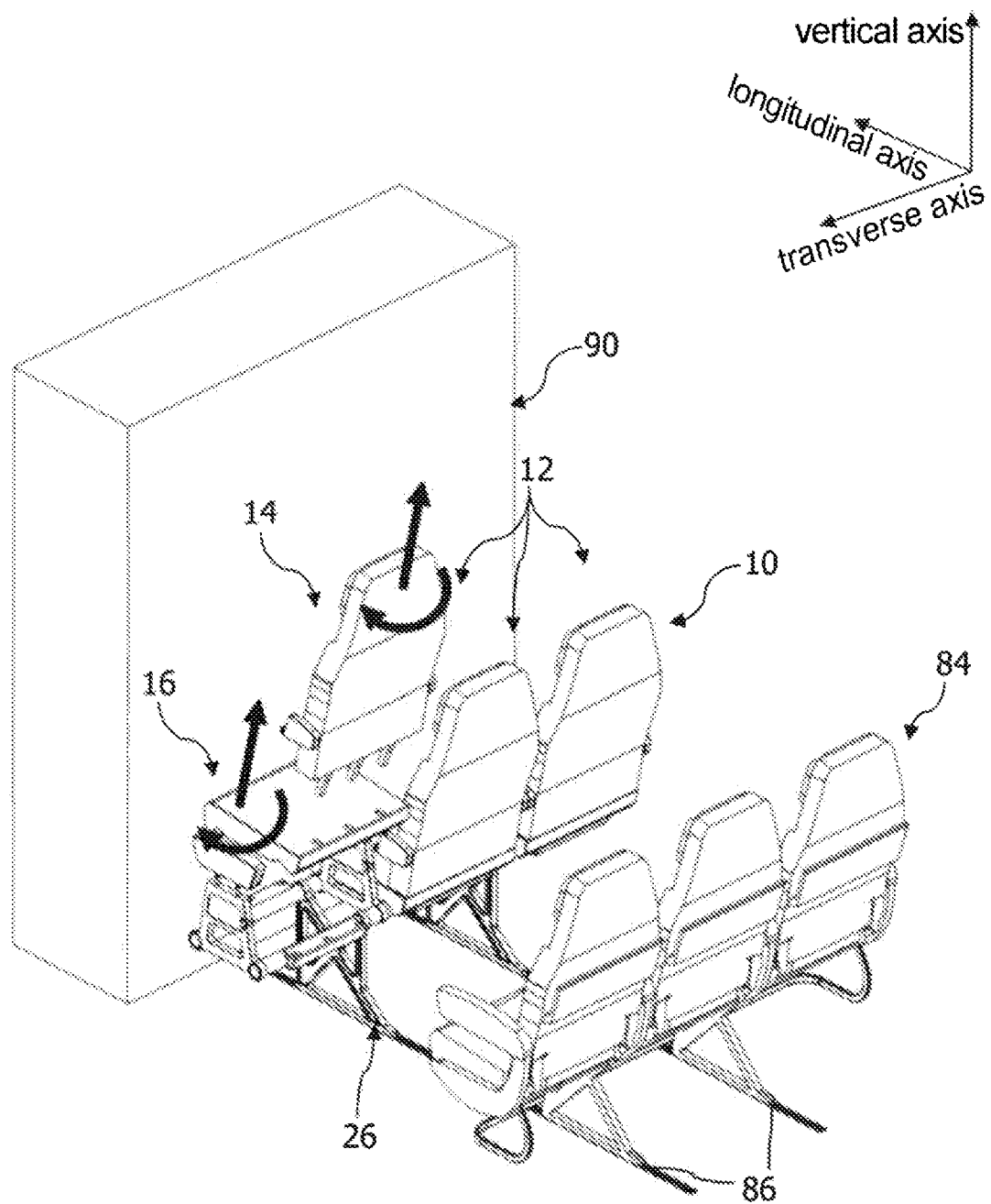
Figure 21D:
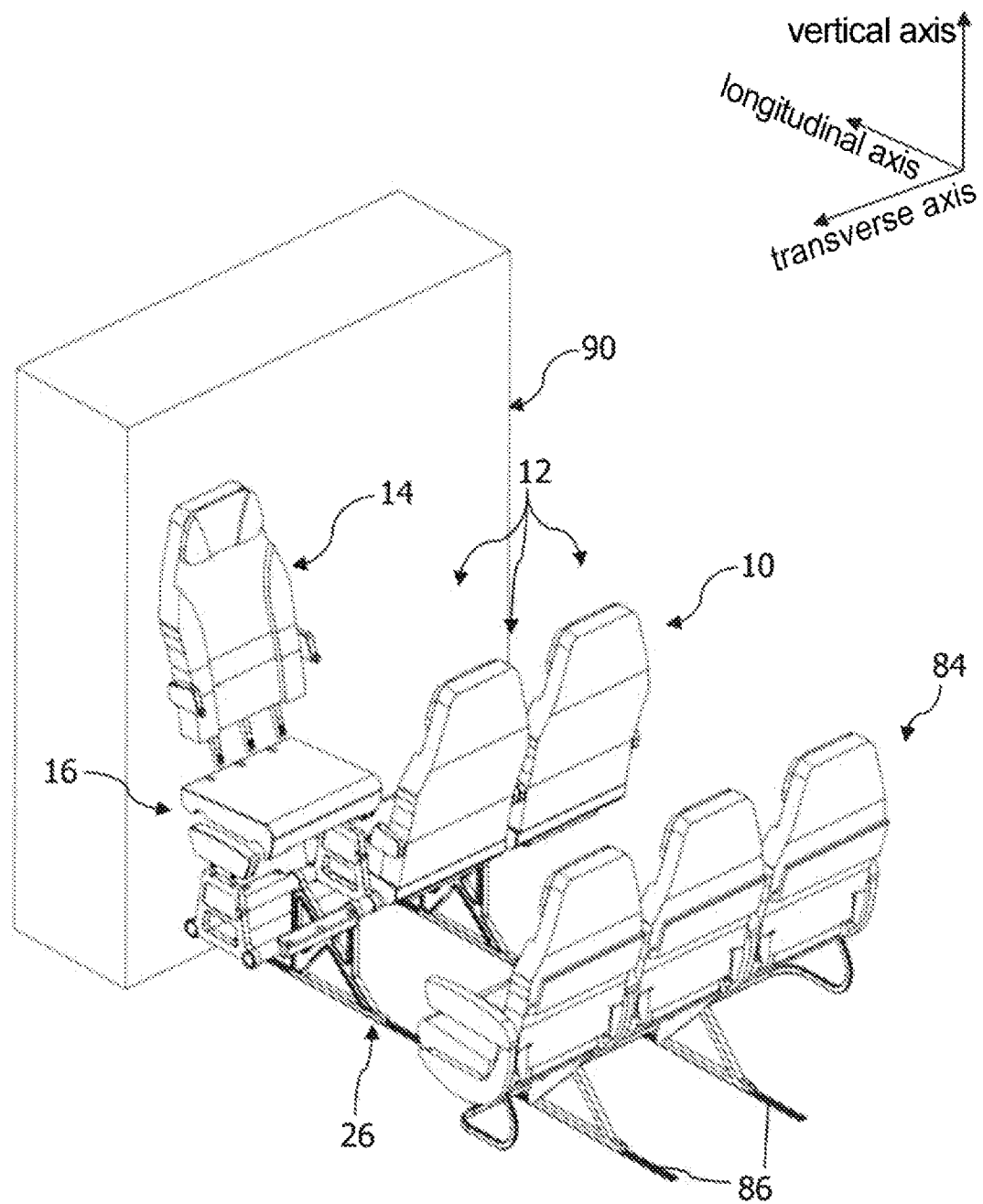
Figure 21E:
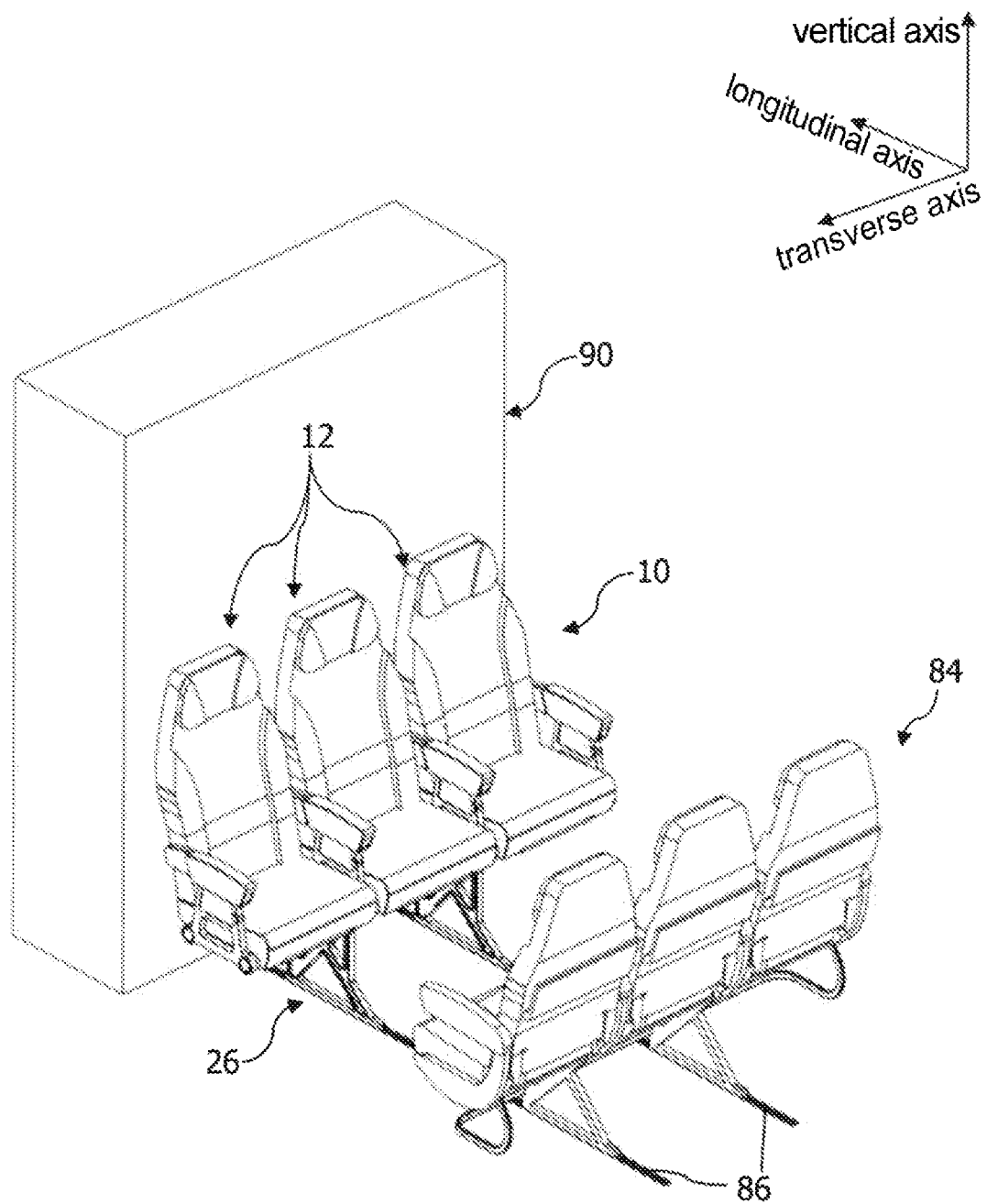

As shown in FIGS. 21c to 21e, the individual seat units 12 of the passenger seat arrangement 10 are then reconfigured, so that each of the seat units 12 of the passenger seat arrangement 10 are aligned counter to the longitudinal direction of the aircraft. The conversion of the individual seat units 12 takes place in a way corresponding to the method shown in FIGS. 11a to 11l. In particular, for each seat unit 12 of the passenger seat arrangement 10, the backrest element 14 is released from the first backrest holder 32 and is fixed to the second backrest holder 34 of the seat mounting 30. In this way, a configuration of the passenger seat arrangement in which the individual seat units 12 of the passenger seat arrangement 10 are arranged opposite the seat units of the further passenger seat arrangement 84 is set up.

Figure 21F:
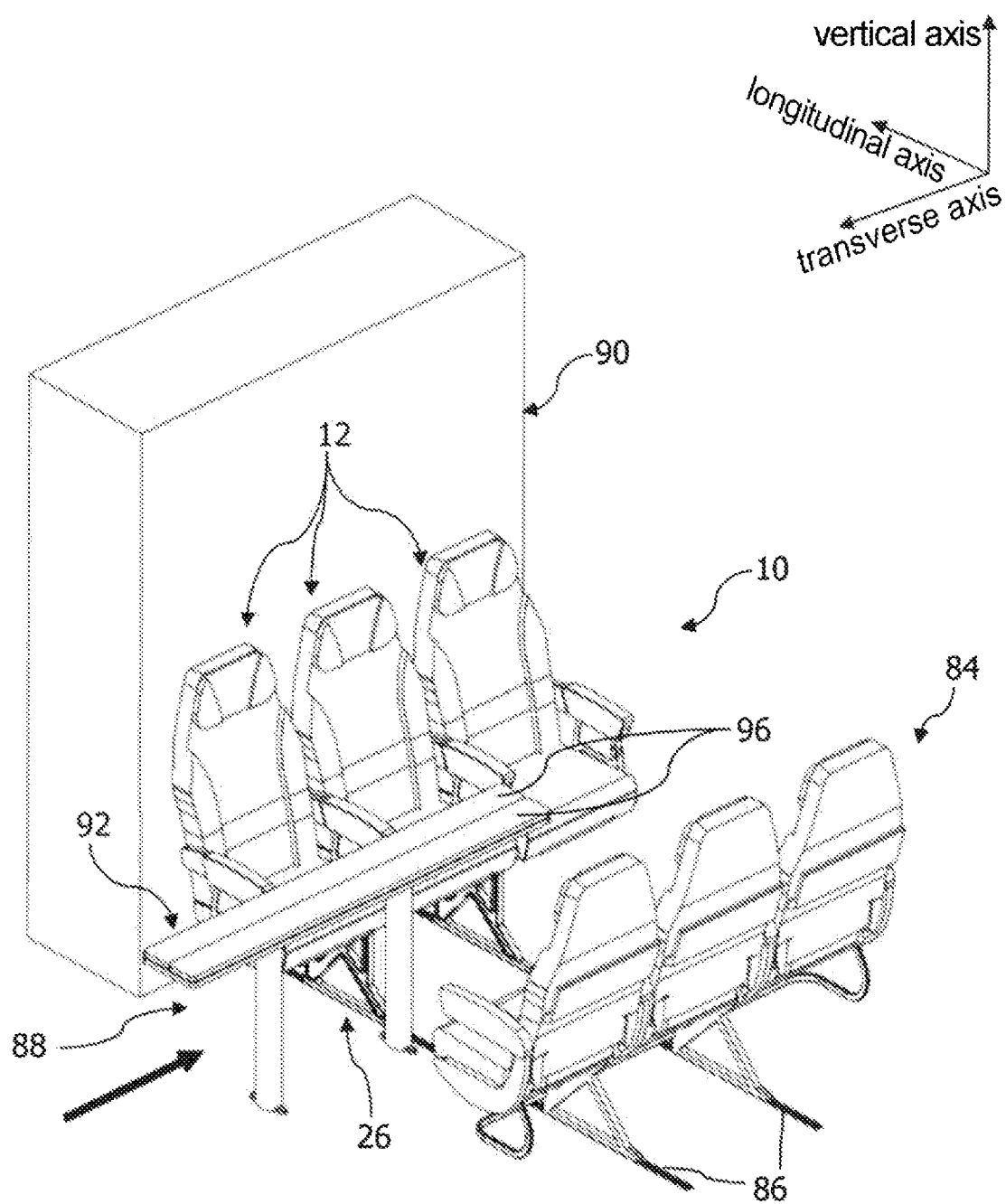
Figure 21G:
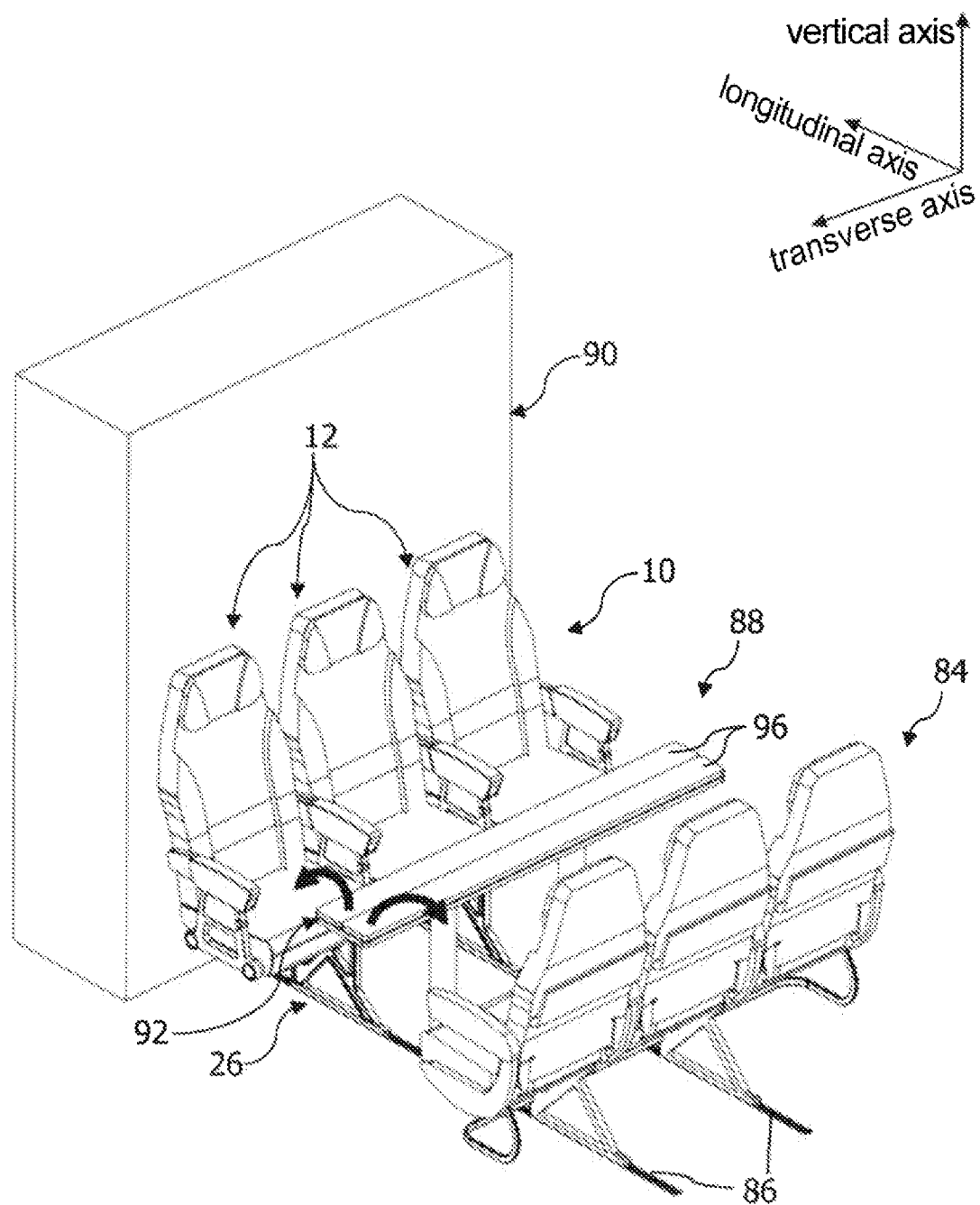
Figure 21H:
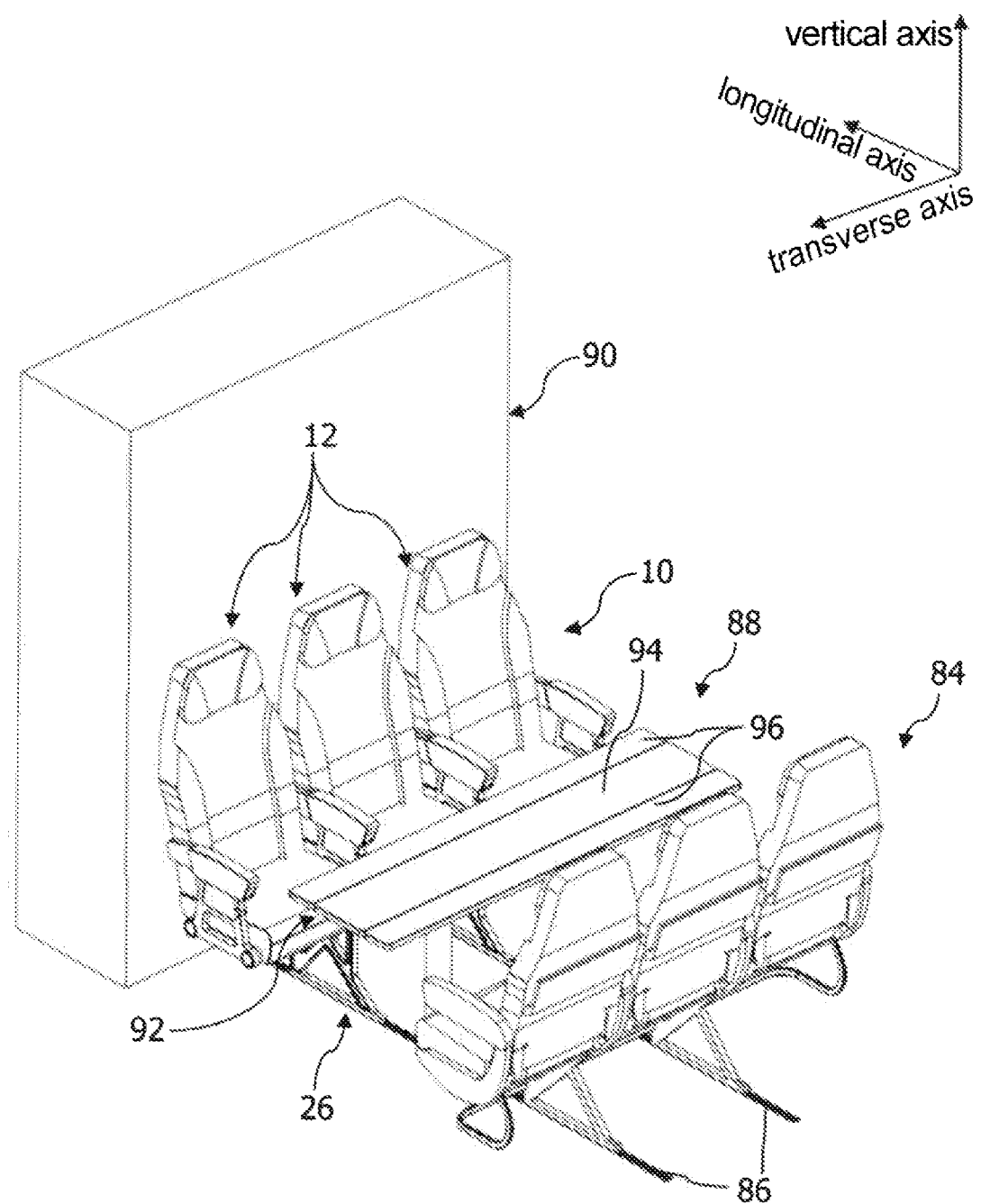

In a next step, the table arrangement 88 is installed between the passenger seat arrangement 10 and the further passenger seat arrangement 84 in the aircraft. This takes place by connecting the table arrangement 88 to the seat rail 86 of the aircraft in a load-transferring manner, as shown in FIGS. 21f to 21g. The table arrangement 88 comprises a folding table 92, which comprises a base plate 94 with two wing plates 96 pivotably arranged at opposite ends of the base plateable 94. In a folded-away state of the table 92, the wing plates 96 are arranged adjacent to one another on the base plate 94 and form a surface of the table 92, as illustrated in FIG. 21g. In order to transfer the table 92 into a folded-out state, the wing plates 96 are pivoted into a folded-out position, so that they are arranged flush with the base plate 94 and together with it form a surface of the table 92, as shown in FIG. 21h. The passenger seat system described here allows that the previously described method steps can also be carried out during flight operation of the aircraft by the flight personnel.

Figure 22:
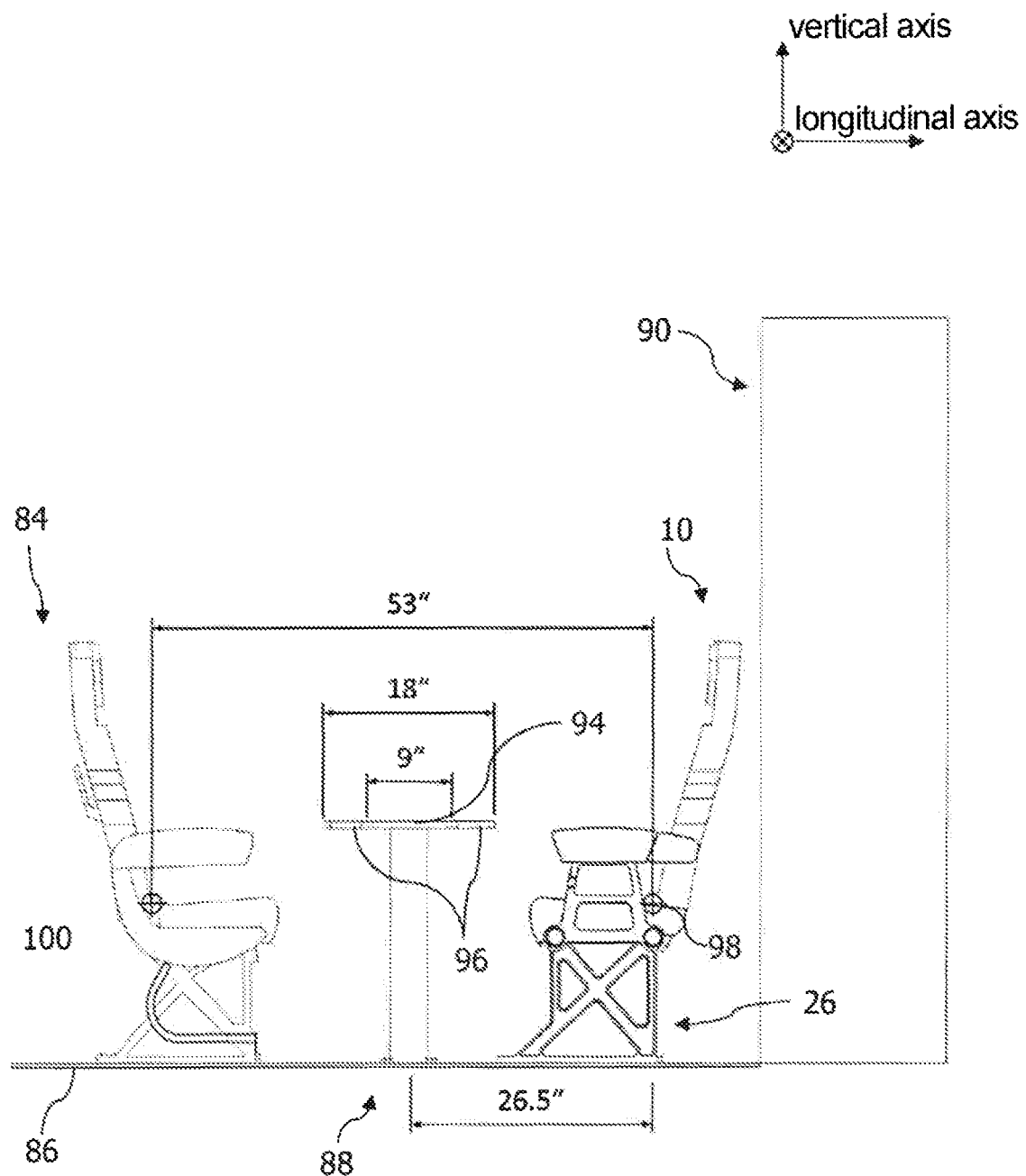
FIG. 22 shows a side view of the passenger seat system shown in FIG. 21*h*.

FIG. 22 shows a side view of the arrangement of the passenger seat system shown in FIG. 21h. In it, dimensions of the individual components of the passenger seat system and their distances from one another are illustrated. The values shown therein for the dimensions and distances represent a minimum amount, i.e., are lower threshold values.

A connecting point between the seat area and the backrest area of the seat units respectively serves as reference points 98, 100 of the passenger seat arrangement 10 and the further passenger seat arrangement 84. As shown in FIG. 25, a distance in the longitudinal direction of the aircraft between the reference point 98 of the passenger seat arrangement 10 and the reference point 100 of the further passenger seat arrangement 84 is at least 53". The table arrangement 88 is mirror-symmetrical to a plane of symmetry parallel to the vertical axis and transverse axis of the aircraft. In the longitudinal direction of the aircraft, the table arrangement 88 is arranged midway between the reference point 98 of the passenger seat arrangement 10 and the reference point 100 of the further passenger seat arrangement 84. Consequently, a distance in the longitudinal direction of the aircraft between the plane of symmetry of the table arrangement and the reference point 98 of the passenger seat arrangement 10 or the reference point 100 of the further passenger seat arrangement 84 is at least 26.5". In a folded-out state of the table 92, its surface extends in the longitudinal direction of the aircraft at least over 18", the base plate 94 of the table 92 extending in the longitudinal direction of the aircraft at least over 9".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat arrangement for installation in an aircraft, comprising:
   at least one seat unit with a backrest element and a seat element;
   a supporting frame, which carries the at least one seat unit and comprises at least one seat mounting, which has a first backrest holder, to which the backrest element can be fixed in a releasable and load-transferring manner in a first position on the seat mounting, and a second backrest holder, to which the backrest element can be fixed in a releasable and load-transferring manner in a second position on the seat mounting, wherein the backrest element comprises at least one first engaging element, which is configured to engage releasably with at least one complementary second engaging element formed in the first and the second backrest holder, in order to fix the backrest element in a load transferring manner in the first or second position on the seat mounting, wherein the at least one first engaging element is formed on at least one connecting strut of the backrest element and the first and the second backrest holder are respectively provided with at least one receiving opening having the second engaging element, into which the connecting strut formed with the first engaging element can be pushed, in order to engage the first engaging element with one of the second engaging elements; and a locking mechanism, which locks the backrest element to at least one of the first or the second backrest holder and is configured to move at least one of the first engaging element or the second engaging element of at least one of the first or the second backrest holder between a locking position, in which the first engaging element is engaged with the second engaging element of the first or the second backrest holder, and a release position, in which a movement of the first engaging element in relation to the second engaging element of at least one of the first or the second backrest holder is released, wherein, in a state of the passenger seat arrangement in which it is installed in the aircraft, the backrest element is pivoted in relation to a longitudinal axis of the aircraft in a state in which it is fixed to the first backrest holder relative to a state in which it is fixed to the second backrest holder, and wherein the first backrest holder comprises at least one of a first locking bolt or the second backrest holder comprises a second locking bolt, which forms the locking mechanism, wherein the at least one second engaging element is arranged on a circumference of at least one of the first or the second locking bolt, and wherein at least one of the first or the second locking bolt is movable in a direction along a longitudinal direction of the first or the second locking bolt, in order to move the second engaging element of at least one of the first or the second backrest holder between the locking position and release position of the first or the second backrest holder.

2. The passenger seat arrangement according to claim 1, in which, in the state of the passenger seat arrangement in which the passenger seat arrangement is installed in the aircraft, the backrest element is pivoted by substantially 90° or 180° in relation to the longitudinal axis of the aircraft in the state in which the backrest element is fixed to the first backrest holder relative to the state in which the backrest element is fixed to the second backrest holder.

3. The passenger seat arrangement according to claim 1, in which the locking mechanism comprises:
at least one spring unit, which loads at least one of the first engaging element or the second engaging element of at least one of the first or the second backrest holder in a direction of the locking position or release position of the second backrest holder.

4. The passenger seat arrangement according to claim 1, in which the locking mechanism comprises:
a blocking mechanism, which blocks at least one of the first engaging element or the second engaging element of at least one of the first or the second backrest holder in at least one of the locking position or a blocking position of the first or second backrest holder and is movable between the blocking position, in which a movement of at least one of the first engaging element or the second engaging element of at least one of the first or the second backrest holder between the locking position and a release position of the first or the second backrest holder is blocked, and the release position, in which a movement of at least one of the first engaging element or the second engaging element of at least one of the first or the second backrest holder between the locking position and release position of the first or the second backrest holder is released.

5. The passenger seat arrangement according to claim 1, in which the seat element is fixed to the seat mounting and is provided in a region of the first backrest holder with at least one first clearance, in which, in an installed state of the backrest element on the first backrest holder, at least one of the first backrest holder or the backrest element, is partly accommodated, and is provided in the region of the second backrest holder with at least one second clearance, in which, in an installed state of the backrest element on the second backrest holder, at least one of the second backrest holder or the backrest element, is partly accommodated.

6. The passenger seat arrangement according to claim 1, further comprising at least one armrest element, configured to be fixed in a releasable and load transferring manner to the backrest element and the seat mounting.

7. The passenger seat arrangement according to claim 6, in which the armrest element comprises:
a first connecting element, which is configured to engage releasably with a complementary second connecting element attached to the backrest element, in order to fix the armrest element to the backrest element in a load-transferring manner, wherein, the first connecting element and the second connecting element interact in a state in which they are engaged on one another in such a way that a rotational movement of the armrest element in relation to the backrest element is blocked and a translational movement of the armrest element in relation to the backrest element in the direction of a release position of the armrest element is released, in order to release the first connecting element from the second connecting element.

8. The passenger seat arrangement according to claim 6, in which the armrest element comprises at least one of:
a third connecting element, which is configured to engage releasably with a fourth connecting element attached to the seat mounting, in order to fix the armrest element on the seat mounting in a load-transferring manner, wherein, the third connecting element and the fourth connecting element interact in a state in which they are engaged on one another in such a way that a rotational movement of the armrest element in relation to the seat mounting is blocked and a translational movement of the armrest element in relation to the seat mounting in the direction of the release position of the armrest element is released, in order to release the third connecting element from the fourth connecting element; or
a further blocking mechanism, which is configured to block a movement of the armrest element in a direction of a release position in a state of the armrest element in which it is fixed to the backrest element and the seat mounting.

9. A passenger seat arrangement for installation in an aircraft, comprising:
at least one seat unit with a backrest element and a seat element; and
a supporting frame, which carries the at least one seat unit and comprises at least one seat mounting, which has a first backrest holder, to which the backrest element can be fixed in a releasable and load-transferring manner in a first position on the seat mounting, and a second backrest holder, to which the backrest element can be fixed in a releasable and load-transferring manner in a second position on the seat mounting,
wherein, in a state of the passenger seat arrangement in which it is installed in the aircraft, the backrest element is pivoted in relation to a longitudinal axis of the aircraft in a state in which it is fixed to the first backrest holder relative to a state in which it is fixed to the second backrest holder, and
wherein the seat element can be fixed in a releasable and load-transferring manner to the first backrest holder in a first position or to the second backrest holder in a second position, wherein, in the state of the passenger seat arrangement in which it is installed in the aircraft, the seat element is pivoted about an axis parallel to a vertical axis of the aircraft in a state in which it is fixed to the first backrest holder relative to a state in which it is fixed to the second backrest holder, and wherein, the backrest element can be fixed to the first backrest holder in a state in which the seat element is fixed to the second backrest holder, or the backrest element can be fixed to the second backrest holder in a state in which the seat element is fixed to the first backrest holder.

10. The passenger seat arrangement according to claim 9, in which, in the state of the passenger seat arrangement in which the passenger seat arrangement is installed in the aircraft, the seat element is pivoted by substantially 90° or 180° about the axis parallel to the vertical axis of the aircraft in the state in which the seat element is installed on the first backrest holder relative to the state in which the seat element is installed on the second backrest holder.

11. The passenger seat arrangement according to claim 9, in which the seat element has at least one third engaging element, which complements the second engaging element and is configured to engage releasably with at least one of the second engaging elements formed in the first and the second backrest holder, in order to fix the seat element in a load-transferring manner in the first or second position of the seat element on the seat mounting, wherein the at least one third engaging element is formed on at least one connecting strut of the seat element, which is configured to be pushed into an at least one receiving opening of the first or the second backrest holder, in order to engage the third engaging element with one of the second engaging elements.

12. The passenger seat arrangement according to claim 11, in which the seat element has at least one clearance, in which, in an installed state of the backrest element and the seat element on the seat mounting, the at least one connecting strut of the backrest element, is partly accommodated.

13. The passenger seat arrangement according to claim 11, in which the seat element is fixed to the seat mounting and is provided in a region of the first backrest holder with at least one first clearance, in which, in an installed state of the backrest element on the first backrest holder, the at least one connecting strut of the backrest element is partly accommodated in the first clearance in the installed state of the backrest element on the first backrest holder and is provided in the region of the second backrest holder with at least one second clearance, in which, in an installed state of the backrest element on the second backrest holder, the at least one connecting strut of the backrest element is partly accommodated in the second clearance in the installed stated of the backrest element on the second backrest holder.

14. The passenger seat arrangement according to claim 9, in which the seat element has at least one clearance, in which, in an installed state of the backrest element and the seat element on the seat mounting, the first or second backrest holder are partly accommodated.

15. The passenger seat arrangement according to claim 9, in which the seat element has at least one clearance, in which, in an installed state of the backrest element and the seat element on the seat mounting, the backrest element is partly accommodated.

* * * * *